United States Patent
Chen et al.

(10) Patent No.: US 11,507,350 B2
(45) Date of Patent: Nov. 22, 2022

(54) PROCESSING APPARATUS AND PROCESSING METHOD

(71) Applicant: Cambricon (Xi'an) Semiconductor Co., Ltd., Xi'an (CN)

(72) Inventors: Tianshi Chen, Pudong New Area (CN); Shengyuan Zhou, Pudong New Area (CN); Zidong Du, Pudong New Area (CN); Qi Guo, Pudong New Area (CN)

(73) Assignee: CAMBRICON (XI'AN) SEMICONDUCTOR CO., LTD., Xi'an (CN)

(*) Notice: Subject to any disclaimer, the term of this patent is extended or adjusted under 35 U.S.C. 154(b) by 329 days.

(21) Appl. No.: 16/697,603

(22) Filed: Nov. 27, 2019

(65) Prior Publication Data

US 2020/0097793 A1    Mar. 26, 2020

Related U.S. Application Data

(63) Continuation of application No. 16/476,262, filed as application No. PCT/CN2018/083415 on Apr. 17, 2018.

(30) Foreign Application Priority Data

Apr. 21, 2017    (CN) .......................... 201711468817.1

(51) Int. Cl.
  *G06F 7/544* (2006.01)
  *G06N 3/04* (2006.01)
  *G06N 3/08* (2006.01)
(52) U.S. Cl.
  CPC ............. *G06F 7/5443* (2013.01); *G06N 3/04* (2013.01); *G06N 3/08* (2013.01)

(58) Field of Classification Search
  CPC ........... G06N 3/04; G06N 3/08; G06F 7/5443
  See application file for complete search history.

(56) References Cited

U.S. PATENT DOCUMENTS 9,189,200 B1    11/2015    Langhammer
2005/0257026 A1    11/2005    Meeker
(Continued)

FOREIGN PATENT DOCUMENTS

CN    101038681 A    9/2007
CN    101527010 A    9/2009
(Continued)

OTHER PUBLICATIONS

EP 19214320.4, European Search Report dated Mar. 24, 2020, 8 pages.
(Continued)

*Primary Examiner* — Michael D. Yaary
(74) *Attorney, Agent, or Firm* — Getech Law LLC; Jun Ye

(57) ABSTRACT

The present disclosure relates to a fused vector multiplier for computing an inner product between vectors, where vectors to be computed are a multiplier number vector $\vec{A}\{AN \ldots A2A1A0\}$ and a multiplicand number $\vec{B}\{BN \ldots B2B1B0\}$, $\vec{A}$ and $\vec{B}$ have the same dimension which is N+1. The multiplier includes: N+1 multiplication sub-units configured to perform multiplication on each dimension of a vector respectively, and take lower n bits of the multiplier number vector for multiplication each time, where the n bits are removed from the binary number of each dimension of the multiplier number vector after the n bits are taken, and n is larger than 1 and less than N+1; an adder tree configured to perform addition on results of N+1 multiplication sub-units obtained from a same operation each time; and a result (Continued)

register configured to hold a result of every addition performed by the adder tree and send the result to the adder tree for next computation.

6 Claims, 21 Drawing Sheets

(56) References Cited

U.S. PATENT DOCUMENTS

| | | | |
|---|---|---|---|
| 2009/0271465 A1 | 10/2009 | Pistorius et al. | |
| 2011/0055308 A1 | 3/2011 | Mantor et al. | |
| 2014/0006467 A1* | 1/2014 | Samudrala | G06F 7/4876 |
| | | | 708/503 |
| 2014/0164457 A1 | 6/2014 | Chaudhuri | |
| 2014/0208081 A1 | 7/2014 | Yap | |
| 2015/0046671 A1 | 2/2015 | Ould-Ahmed-Vall | |
| 2016/0328647 A1 | 11/2016 | Lin et al. | |
| 2017/0102920 A1 | 4/2017 | Henry et al. | |

FOREIGN PATENT DOCUMENTS

| | | |
|---|---|---|
| CN | 101571796 A | 11/2009 |
| CN | 101685388 A | 3/2010 |
| CN | 103699360 A | 4/2014 |
| CN | 104011657 A | 8/2014 |
| CN | 104699458 A | 6/2015 |
| CN | 105005911 A | 10/2015 |
| CN | 105207794 A | 12/2015 |
| CN | 105359129 A | 2/2016 |
| CN | 105426160 A | 3/2016 |
| CN | 105453071 A | 3/2016 |
| CN | 105512723 A | 4/2016 |
| CN | 106066783 A | 11/2016 |
| CN | 106447034 A | 2/2017 |
| CN | 106528047 A | 3/2017 |
| EP | 0428942 A2 | 5/1991 |
| EP | 0428942 A3 | 5/1991 |

OTHER PUBLICATIONS

CN 201710264686.9, Official Action dated Apr. 17, 2020, 11 pages. (No English Translation).
CN 201710269106.5, Official Action dated Mar. 26, 2020, 11 pages. (No English Translation).
CN 201811097653.0, Official Action dated Apr. 30, 2020, 8 pages, (No English Translation).
Article 296-302 "Binary Number Multiplier" 2020, 19 pages (11 pages of Translation, 8 pages of Article).
PCT/CN2018/083415—International Search Report, dated Jul. 20, 2018, 10 pages. (no English translation).
CN 201710264686.9—Second Office Action, dated Dec. 23, 2020, 10 pages. (no English translation).
CN 201710264686.9—Third Office Action, dated Mar. 18, 2021, 12 pages. (no English translation).
Xu Jianbang, et.al, "National Defense Industry Press", DSP Algorithm and Architecture Realization Technology, Jan. 31, 2010, 4 pages. (no English translation).
CN 201710256445.X—First Office Action, dated Sep. 25, 2020, 10 pages (no English translation).
Tao Wang, et al., "The Study and Realization of Instruction Folding in Java Processor", Computer Research and Development, vol. 37 No. 1, Jan. 31, 2000, 5 pages. (with English abstract).
Yigang Zhang, "Harbin Institute of Technology Press" MCS-51 Singer Chip Microcomputer Application Design, 2nd Edition, Dec. 31, 1997, 3 pages. (no English translation).
CN 201710269049.0—First Office Action, dated May 15, 2020, 7 pages. (no English translation).
CN 201710269106.5—Second Office Action, dated Nov. 3, 2020, 5 pages. (no English translation).
CN 201711468817.1—First Office Action, dated Dec. 8, 2020, 8 pages. (no English translation).
CN 201811097569.9—First Office Action, dated Aug. 3, 2020, 11 pages. (no English translation).
EP 18788355.8—Extended European Search Report, dated Jan. 22, 2021, 8 pages.
EP 18788355.8—Response to the Communication under Rules 161 and 162 EPC dated Nov. 26, 2019, filed Feb. 4, 2020, 18 pages.
Taesik Na, et al., "Speeding Up Convolutional Neural Network Training with Dynamic precision Scaling and Flexible Mlultiplier-Accumulator", ISLPED, Aug. 2016, 6 pages.
KR 10-2019-7025307—Response to Office Action, filed Feb. 9, 2021, 22 pages. (no English translation).
KR 10-2019-7025307—Office Action, dated Dec. 28, 2020, 3 pages. (no English translation).
JP 2019-228383—First Office Action, 2019, 5 pages. (no English translation).
EP 19214371.7—Extended European Search Report, dated Jan. 25, 2021, 9 pages.
EP 19 214 320.4, Communication pursuant to Article 94(3), 6 pages.
JP 2019-549467 Notice of Reason for Refusal, dated Jan. 19, 2021, 14 pages, (with English translation).

* cited by examiner

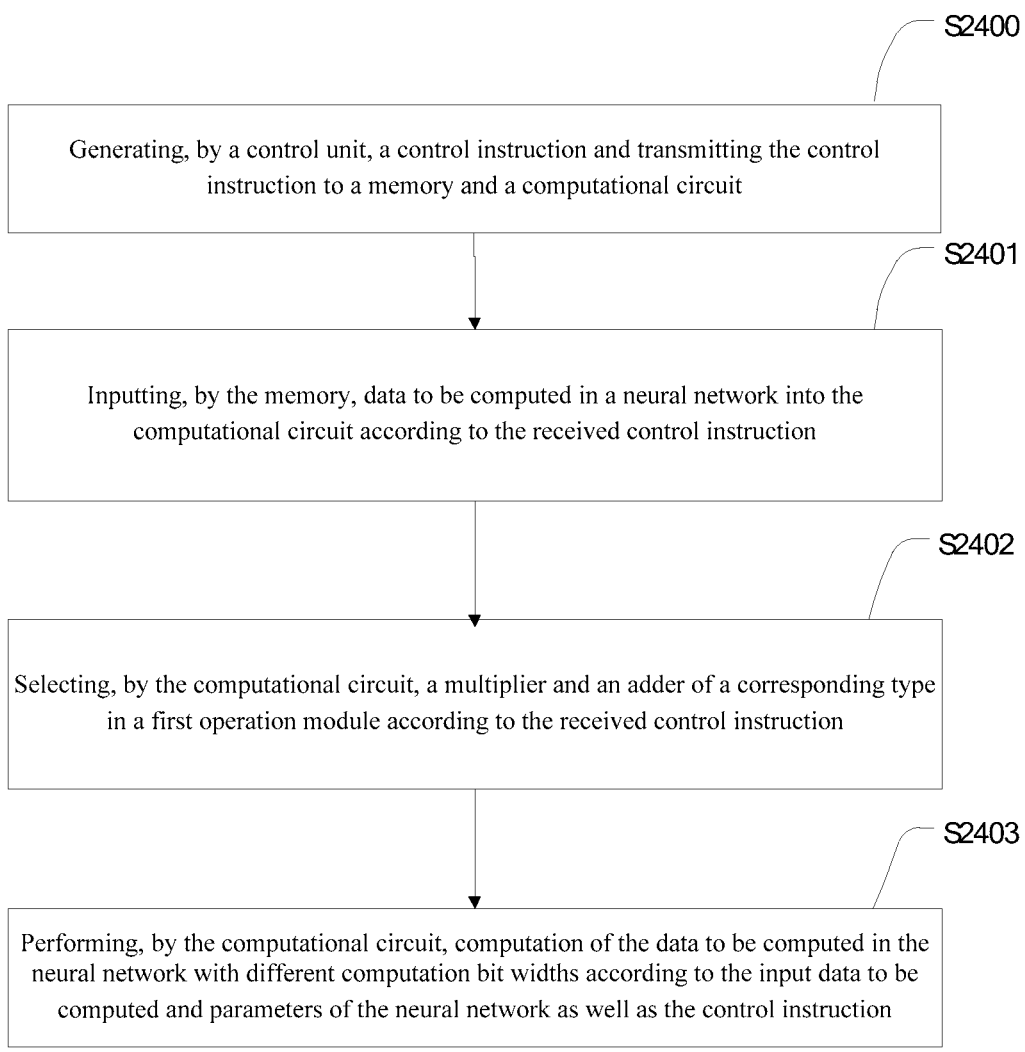

FIG. 23

```
                                                                    S2400
┌─────────────────────────────────────────────────────────────────┐
│  Generating, by a control unit, a control instruction and       │
│  transmitting the control instruction to a memory and a         │
│  computational circuit                                          │
└─────────────────────────────────────────────────────────────────┘
                                    │
                                    ▼                               S2401
┌─────────────────────────────────────────────────────────────────┐
│  Inputting, by the memory, data to be computed in a neural      │
│  network into the computational circuit according to the        │
│  received control instruction                                   │
└─────────────────────────────────────────────────────────────────┘
                                    │
                                    ▼                               S2402
┌─────────────────────────────────────────────────────────────────┐
│  Selecting, by the computational circuit, a multiplier and an   │
│  adder of a corresponding type in a first operation module      │
│  according to the received control instruction                  │
└─────────────────────────────────────────────────────────────────┘
                                    │
                                    ▼                               S2403
┌─────────────────────────────────────────────────────────────────┐
│  Performing, by the computational circuit, computation of the   │
│  data to be computed in the neural network with different       │
│  computation bit widths according to the input data to be       │
│  computed and parameters of the neural network as well as the   │
│  control instruction                                            │
└─────────────────────────────────────────────────────────────────┘
```

FIG. 24

PROCESSING APPARATUS AND PROCESSING METHOD

TECHNICAL FIELD

The present disclosure relates to the field of computer, and further relates to a fused vector multiplier and a method of using the multiplier to perform computation.

BACKGROUND

With the advent of the era of big data, neural network algorithms have become a research hotspot in the field of artificial intelligence in recent years, and have been widely used in pattern recognition, image analysis, and intelligent robots. However, since the algorithms are often used for handling big data that may further include a multi-layer structure and a large number of computations, the algorithms set stricter requirements for computation specification and computation speed. On the one hand, facing a large amount of data and a large number of computations in neural network algorithms, computing units should be able to complete required tasks quickly, which means computing units need to satisfy a stricter speed requirement. On the other hand, during computations, a large amount of computation data may not have the same data specification, and bit width of data as well as an amount of data between layers may not be the same either, which poses dynamic configurability requirements on computing units. Meanwhile, if a range of precision loss is tolerable, a decrease in bit width of data may promote computation efficiency of computing units effectively. The demand for a tradeoff between precision and efficiency may improve diversity of bit width of data and dynamic configurability of bit width of data during computations. Therefore, computing units should have dynamic configurability to meet demands of different data specifications and different bit widths of data.

In prior art, a method for realizing neural networks is performing computations on a central processing unit (CPU) or a graphics processing unit (GPU) directly. The method may not be able to perform effective acceleration for neural networks since the structure of CPU or GPU is required to be versatile, or may not be able to satisfy the requirement of a large number of neural network operations due to a small on-chip cache. Another method is configuring neural networks and performing neural network operations on a field programmable gate array (FPGA) or application specific integrated circuit (ASIC). However, on the one hand, FPGA may have a low dominant frequency and high energy consumption, and may be constrained by the resources of itself when performing configurable programming on neural networks. Thus, FPGA may not be applicable for the acceleration of neural network operations, and may fail to meet demands of different data specifications and different bit widths of data. On the other hand, even when ASIC is used for the design and acceleration of neural networks, apparatus with ASIC may often be constrained by its storage device and computation device. The apparatus may only be able to support data storage and computations that have a fixed length, and cannot dynamically configure computations between different bit widths, thus lacking flexibility.

SUMMARY

(I) Technical Problem to be Solved

A purpose of the present disclosure is to provide a processing device and a method with dynamically configurable computation bit width to overcome at least one of the above-mentioned technical problems.

(II) Technical Solutions

The present disclosure provides a processing device, where the device may include: a memory that may be configured to store data, where the data may include data to be computed in a neural network; an computational circuit that may be configured to compute the data to be computed in the neural network, which may include performing computations on the data to be computed in the neural network with different computation bit widths by using an adder circuit and a multiplier circuit; and a control circuit that may be configured to control the memory and the computational circuit, which may include determining a type of the multiplier circuit and the adder circuit of the computational circuit according to the data to be computed so as to perform computations.

The present disclosure also provides a method of using the aforesaid processing device, where the method may include the following steps: generating, by the control circuit, a control instruction, and transmitting the control instruction to the memory and the computational circuit; inputting, by the memory, data to be computed in a neural network into the computational circuit according to the received control instruction; selecting, by the computational circuit, a multiplier circuit and an adder circuit of a corresponding type in a first computation module according to the received control instruction; performing, by the computational circuit, computation on the data to be computed in the neural network with different computation bit widths according to the input data to be computed and parameters of the neural network as well as the control instruction, and sending an computation result back to the memory.

An aspect of the present disclosure provides a fused vector multiplier for computing an inner product between vectors, wherein, vectors to be computed are a multiplier number vector $\vec{A}$ {AN . . . A2A1A0} and a multiplicand number $\vec{B}$ {BN . . . B2B1B0}, $\vec{A}$ and $\vec{B}$ may have the same dimension which is N+1, where the multiplier may include:

N+1 multiplication sub-units configured to perform multiplication on each dimension of a vector respectively, and take lower n bits of the multiplier number vector for multiplication each time, where the n bits are removed from a binary number of each dimension of the multiplier number vector after the n bits are taken, and n is larger than 1 and less than N+1;

an adder tree configured to perform addition on results of N+1 multiplication sub-units obtained from a same operation each time; and a result register configured to hold a result of every addition performed by the adder tree and send the result to the adder tree for next computation.

In a further example, each of the multiplication sub-units may include a first shift register for removing the lower n bits of the multiplier number each time.

In a further example, each of the multiplication sub-units may further include a second shift register for performing shift operation on a result obtained after each multiplication.

In a further example, each of the multiplication sub-units may include an input selection circuit configured to input a number corresponding to a dimension of the multiplicand number vector $\vec{B}$ and lower n bits of a corresponding dimension of the multiplier number vector $\vec{A}$, perform AND operation on the lower n bits of the multiplier number and the multiplicand number respectively, and send a result to the second shift register.

In a further example, the n may be 2.

In a further example, the second shift register may perform shift operation by following the manner below:

in the case where input data is a computation result of a $j^{th}$ bit of n bits of an $i^{th}$ operation, left shifting $(i-1)*n+(j-1)$ bits of the current data, wherein 1 is between 1 and $\lceil N+1/n \rceil$, $\lceil \ \rceil$ represents rounding down, and j is between 1 and n.

Another aspect of the present disclosure provides a method for using the fused vector multiplier of any of the examples above, which includes:

sending respective corresponding dimensions of the multiplier number vector $\vec{A}\{AN \ldots A2A1A0\}$ and the multiplicand number vector $\vec{B}\{BN \ldots B2B1B0\}$ to the multiplication sub-units for computation, where each of the multiplication sub-units may perform multiplication on each dimension of the vectors, and taking lower n bits of each dimension of the multiplier number vector for multiplication each time, where the n bits are removed from the binary number of each dimension of the multiplier number vector after the n bits are taken, and n is larger than 1 and less than N+1, using the adder tree to add results of N+1 multiplication sub-units obtained from a same operation each time; and using the result register to hold a result of every addition performed by the adder tree and sending the result to the adder tree for next computation until the multiplier number is 0.

In a further example, the method also includes: when the multiplication sub-units perform computation each time, removing lower n bits of the multiplier number through the first shift register each time, and performing shift operation on a result obtained after multiplication each time through the second shift register In a further example, the performing shift operation by the second shift register follows the manner below:

in the case where input data is a computation result of a $j^{th}$ bit of n bits of an $i^{th}$ operation, left shifting $(i-1)*n+(j-1)$ bits of the current data, where i is between 1 and $\lceil N+1/n \rceil$, $\lceil \ \rceil$ represents rounding down, and j is between 1 and n.

Yet another aspect of the present disclosure provides a neural network computation device including the fused vector multiplier of any of the examples above, where the second register may perform shift operation by following the manner below: in the case where input data is a computation result of a $j^{th}$ bit of n bits of an $i^{th}$ operation, left shifting $(i-1)*n+(j-1)$ bits of the current data, wherein i is between 1 and $\lceil N+1/n \rceil$, $\lceil \ \rceil$ represents rounding down, and j is between 1 and n.

(III) Technical Effects

The fused vector multiplier provided by the present disclosure may effectively utilize the sparseness of data, and only perform efficient computation, which is computation between non-zero data, and may thereby reduce non-effective computation, speed up computation, and improve the performance-to-power ratio. By using a basic multiplier, a sparse multiplier, and/or a fused vector multiplier to change an order of computation, counting operation of a shift value may be greatly reduced, which may thereby effectively improve the performance-to-power ratio.

BRIEF DESCRIPTION OF THE DRAWINGS

FIG. 23 is a structural schematic diagram of a specific implementation flow of a fused vector multiplier device and other multiplier devices provided by the present disclosure.

FIG. 24 is a flowchart of a processing method with dynamically configurable computation bit width provided by an example of the present disclosure.

DETAILED DESCRIPTION

The technical solutions in the examples of the present disclosure are clearly and completely described below with reference to the drawings in the examples of the present disclosure. Apparently, the described examples are only a part of the examples of the present disclosure, rather than all of the examples. All other examples obtained by a person of ordinary skill in the art based on the examples of the present disclosure without creative efforts are within the scope of the present disclosure.

The "memory" described in the present disclosure may be integrated within a processing device with dynamically configurable computation bit width, or may be a separate device, as an external memory for data transmission with a processing device with dynamically configurable computation bit width.

Figure 1:
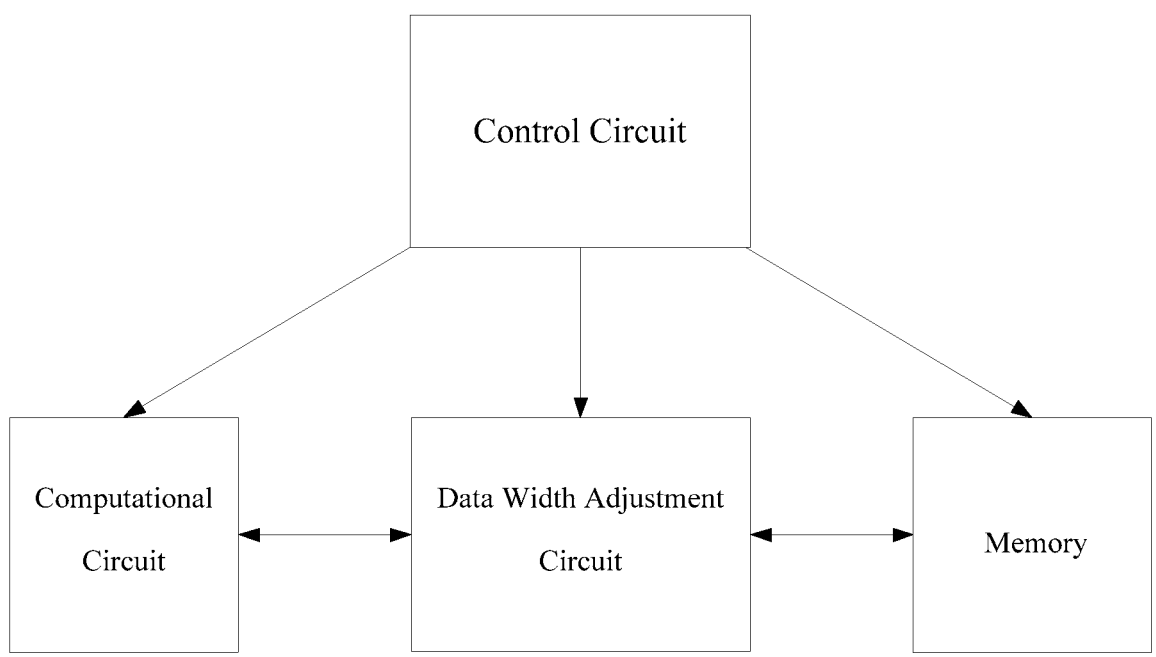
FIG. 1 is a structural schematic diagram of a processing device with dynamically configurable computation bit width provided in an example of the present disclosure.

FIG. 1 is a schematic diagram of a processing device with dynamically configurable computation bit width provided in an example of the present disclosure. As shown in FIG. 1, the device may include a control circuit, a data width adjustment circuit, a computational circuit, and a memory.

The control circuit may be configured to send a control signal to the data width adjustment circuit, the computational circuit, and the memory so as to control the operation of the three and coordinate data transmission among the three. The memory may be configured to store related data which may include input data (including data to be computed and control instructions), intermediate computation results, final computation results, neurons, synapses, data to be cached, etc. Specific data content stored, a manner of organizing the storage, and a manner of accessing and calling may be planned differently according to various needs. As shown in FIG. 1, the data width adjustment circuit may be configured to adjust a width of data. This process may take place as follows: data read from the memory may be transmitted to the computational circuit after undergoing bit width adjustment by the data width adjustment circuit, the computational circuit may transmit a computation result back to the memory after the data undergoes bit width adjustment by the data width adjustment circuit, the data from the memory may undergo bit width adjustment by the data width adjustment circuit and may be transmitted back to the memory, and the like. Specific operations may be controlled by a control signal of the control circuit. The specific operations may include increasing, decreasing, or maintaining a data bit width without loss of precision; increasing, decreasing, or maintaining a data bit width with an acceptable degree of precision loss; increasing, decreasing, or maintaining a data bit width according to some specified transformation or operation requirements (such as specifying a "bitwise AND" computation). The computational circuit may include at least one addition unit and at least one multiplier unit for data computations. The at least one addition unit may include an adder, an addition tree, and/or a serial addition tree; and the at least one multiplier unit may include a basic multiplier, a sparse multiplier, and/or a fused vector multiplier. The computational circuit may further include a comparator and/or an ALU, etc. The multiplier unit and the addition unit can perform computations on data of different computation bit widths, and can perform computations between computation data of different bit widths according to different needs. The multiplier may be a serial computing unit that implements multiplication computations by a bit serial method. It should be noted that the computational circuit may transmit data directly with the memory without passing through the data width adjustment circuit.

Figure 2:
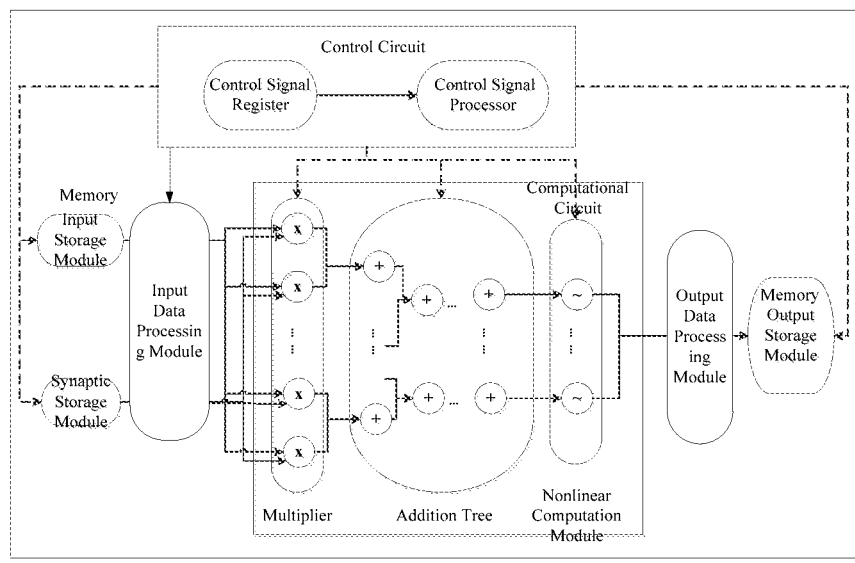
FIG. 2 is a structural schematic diagram of a processing device with dynamically configurable computation bit width provided in another example of the present disclosure.

FIG. 2 is a schematic diagram of a processing device with dynamically configurable computation bit width provided in an example of the present disclosure. As shown by FIG. 2, the structure of this device is as follows: a control circuit may be connected to each module or sub-module of a memory and to a computational circuit, and the control circuit may include at least one control signal register and at least one control processor, and the control signal register may be configured to store control signals, and optionally, the control signal register may follows FIFO method. The control processor may be configured to take out a control signal to be executed, and control and coordinate the memory, a data width adjustment circuit, and a computational circuit after analyzing control logic. The memory may include an input storage module, an output storage module, and a synaptic storage module, where the output storage module may be configured to store intermediate computation results and final computation results. The data width adjustment circuit may be divided into an input data processing module and an output data processing module. The input data processing module may be configured to adjust a data width of data in the input storage module and/or the synaptic storage module, and the input data processing module may be provided after the input storage module. The output data processing module may be configured to perform width adjustment on data computed by the computational circuit and then store the data in the output storage module. The computational circuit may mainly be used for accelerating convolution computations of a convolutional layer and a fully connected layer, and an operation of taking an average or maximum value of a pooling layer. Optionally, the computational circuit may include a multiplier module, an addition tree module, and a nonlinear computation module (e.g., a module that performs a sigmoid function computation). The multiplier module, the addition tree module, and the nonlinear operation module may be executed in parallel in a pipelined manner. The device may accelerate an operation process of a convolutional neural network, reduce on-chip and off-chip data exchange, and save storage space.

Figure 3:
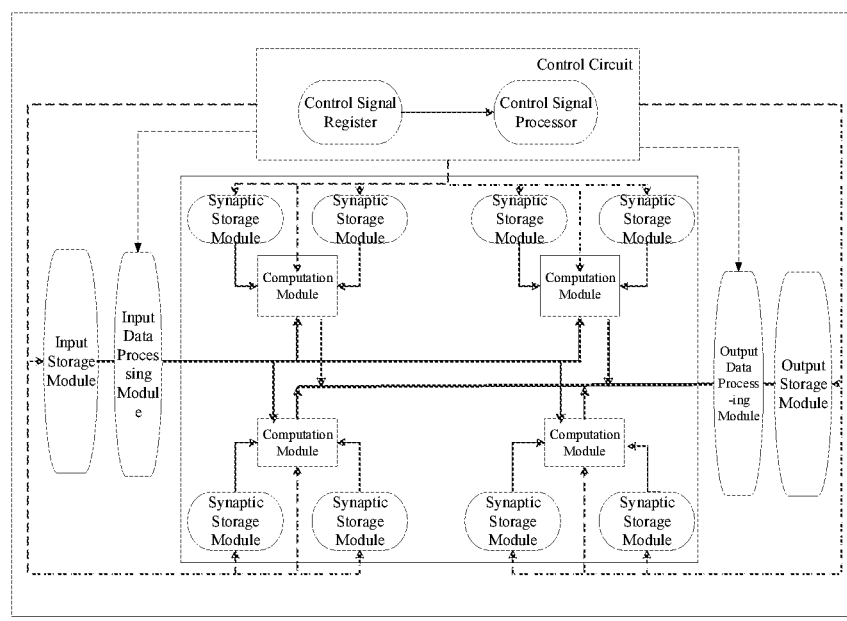
FIG. 3 is a structural schematic diagram of a processing device with dynamically configurable computation bit width provided in a further example of the present disclosure.

FIG. 3 is a schematic diagram of a processing device according to another example of the present disclosure. As shown in FIG. 3, a structure of this device is as follows: a control circuit may be connected to each module of a memory and to a computational circuit, and the control circuit may include a control signal register and a control processor, where the control signal register may be configured to store control signals, and the control processor may be configured to take out a control signal to be executed, and control and coordinate the memory and a computational circuit after analyzing a control logic. Optionally, the control signal register may follow FIFO (First In First Out) method. The memory may include an input storage module, an output storage module, and a synaptic storage module. In the present processing device, the synaptic storage module may include a plurality of synaptic storage sub-modules, and the computational circuit may include a plurality of computation modules, and the synaptic storage sub-modules may correspondingly be connected to the computation modules, respectively. One synaptic storage sub-module may be correspondingly connected to one computation module, or a plurality of synaptic storage sub-modules may be correspondingly connected to one computation module. The data width adjustment circuit may be divided into an input data processing module and an output data processing module. The input data processing module may be configured to adjust a data width of data in the input storage module and/or the synaptic storage module, and the input data processing module may be provided after the input storage module. The output data processing module may be configured to perform width adjustment on data computed by the computational circuit and then store the data in the output storage module. At each computation, after passing through the input data processing module, the input storage module may transmit input data to all the computation modules, and the synaptic storage module may transmit synapse data to corresponding computation modules. After the computation modules perform computations, the output data processing module may write a result in the output storage module. In this way, in large-scale computations with many parameters, the computation efficiency may be significantly improved. The device may effectively accelerate an operation process of a convolutional neural network, and may especially be applicable to large network scale with many parameters.

Figure 4:
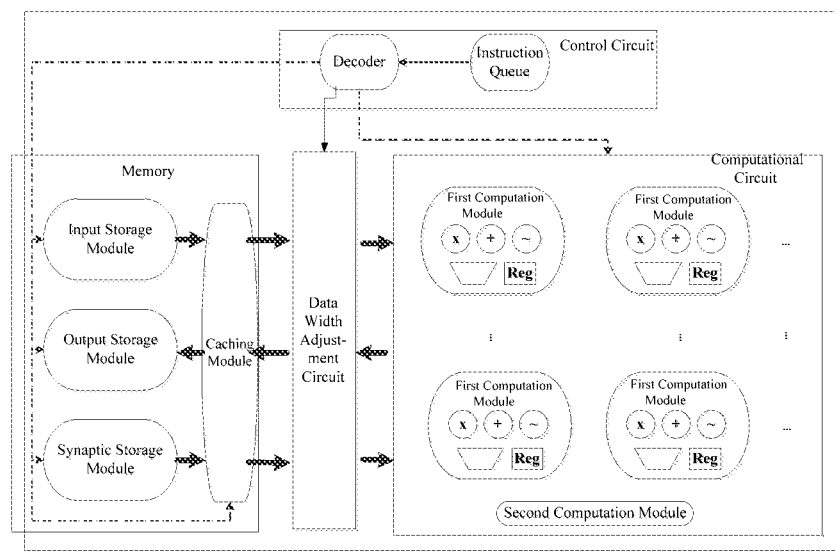
FIG. 4 is a structural schematic diagram of a processing device with dynamically configurable computation bit width provided in yet another example of the present disclosure.

FIG. 4 is a schematic diagram of a processing device according to a further example of the present disclosure. As shown in FIG. 4, a structure of this device is as follows: a control circuit may be connected to each module of a memory and to a computational circuit and a data width adjustment circuit. The control circuit may include an instruction queue and a decoder, each time when a new instruction is executed, a new instruction may be taken from the instruction queue, sent to the decoder, and decoded by the decoder; control information may be sent to each module of the memory, to the computational circuit, and to the data width adjustment circuit. The memory may include an input storage module, an output storage module, a synaptic storage module, and a caching module (cache, buffer, or scratch pad), where the output storage module may be used to store intermediate computation results and final computation results. Each time when the input storage module and the synaptic storage module transmit data to the computational circuit, the data may first be transmitted to the caching module. The cached data may then be read to the data width adjustment circuit. If the control instruction requires processing of the data, the data width adjustment circuit performs corresponding processing, for instance, expanding a bit width of the data without loss of precision, reducing the bit width of the data by forcibly removing a lowest bit of the data, or the like. After undergoing the processing by the data width adjustment circuit, the data may then be transmitted to a corresponding computation module. If the control instruction does not require processing of the data, the data may be transmitted to a corresponding computation module via the data width adjustment circuit directly. Similarly, when the computation module finishes a computation, a result may first be sent to the data width adjustment circuit to accomplish data processing or not to accomplish data processing according to the control instruction, and then transmitted to the caching module, followed by the result being written into the output storage module from the caching module. The computational circuit may include a plurality of computation modules including a first computation module and a second computation module. The computation modules may perform related computations in parallel, and may also transmit data to each other, which may thereby reduce a reuse distance of localized data and further improve the operation speed. The first computation module may mainly be used to accelerate linear computations of the same or different computation bit widths in a neural network algorithm, which may include: inter-matrix multiplication, addition, multiplication and addition; matrix and vector; matrix and constant; inter-vector; vector and constant; constant and constant. The first computation module may also be used for comparison computation, selection of maximum/minimum values, etc. Preferred computations may include dot product, matrix multiplication, and/or matrix addition. The second computation module may be configured to perform computations unfinished in the first computation module, which may include nonlinear computations, division computations, separate addition computations, or separate multiplication computations. A technical effect of such is that a bit width of data may be dynamically adjusted in the computation process according to a control instruction, so that the hardware utilization of the computational circuit and the memory may be further improved.

Figure 5:
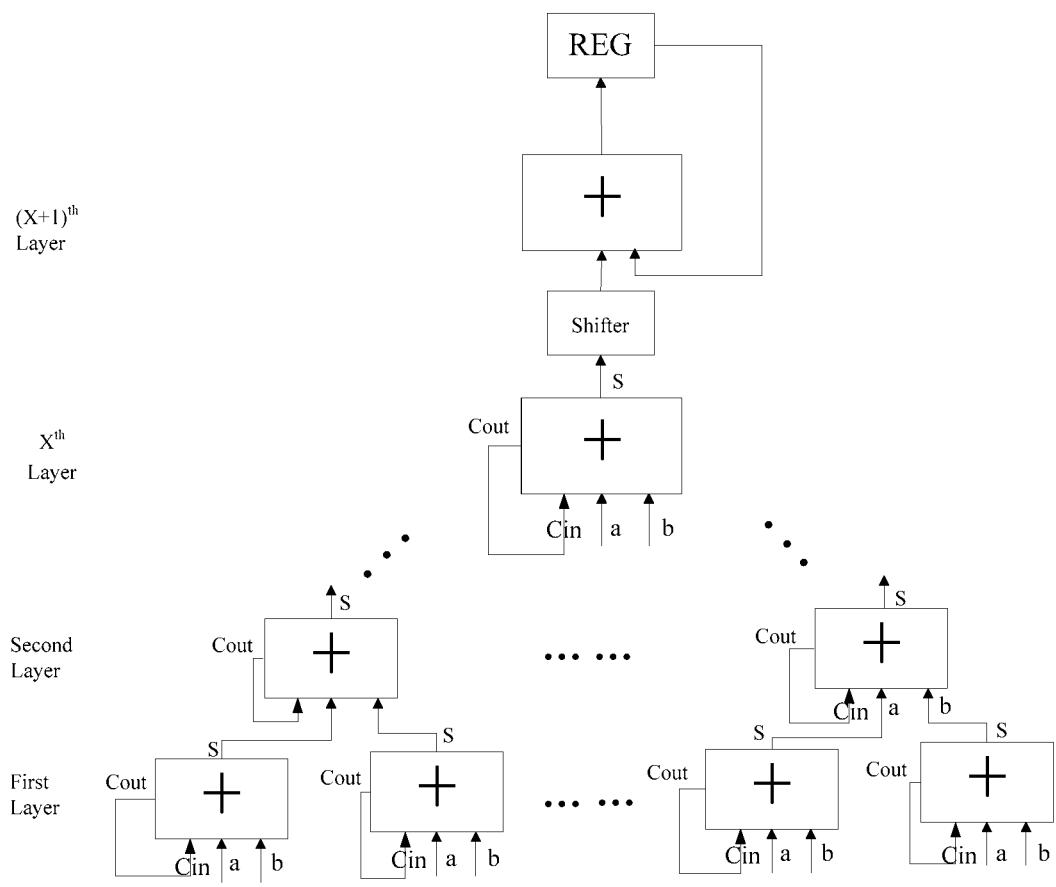
FIG. 5 is a schematic diagram of a bit serial addition tree device for the device of one example of the present disclosure.

FIG. 5 is a schematic diagram of a bit serial addition tree device for the device of an example of the present disclosure, which may be capable of satisfying the requirement for dynamically configurable computation bit width. As shown in FIG. 5, for M data to be computed, the maximum bit width is N, where M and N both are positive integers. For data less than N bits, the number of bits thereof may be supplemented to N bits in a reasonable manner without affecting the precision of the data. Possible manners may include supplementing zeros at a highest/lowest bit, supplementing a sign bit to a highest/lowest bit, bit shifting, performing computations, and the like. Adders in a first layer to a $x^{th}$ layer in the bit-serial addition tree may be able to complete addition on data of n (n≥1) bits, and an adder in the $(x+1)^{th}$ layer may be able to complete addition on data of not less than N bits. First, a carry-in output terminal $C_{in}$ in a register and respective adders may be initialized to zero. Lowest n bits of each data to be computed may be input respectively to a and b terminals of the adders of the first layer, and each adder may complete addition of the lowest n bits of the data to be computed which is input to the a and b terminals. An obtained result value s may be transmitted to a orb terminals of adders of a higher layer. An obtained carry-in value $C_{out}$, which may be transmitted back to a carry-in $C_{in}$ of the adders in the present layer, may undergo addition with transmitted-in data to be computed in a next cycle. An operation of adders of a next layer may be similar. Addition computation on the transmitted-in data may be performed, then a result may be transmitted to a higher layer, and then a carry may be transmitted back to the present layer, until the $x^{th}$ layer is reached. The adder of the $x^{th}$ layer may shift the computation result and add the computation result to the original result transmitted from the register, and then save a final result back to the register. Then, next lowest n bits of the data to be computed may be transmitted to the bit serial addition tree to accomplish corresponding computations. At this time, $C_{in}$ in each adder may be a carry result outputted from the $C_{out}$ terminal of the adder in a previous cycle. Preferably, after the operation of the first-layer adders is completed, a second batch of n-bit data to be computed may be input. By parallel computation, the utilization rate of the computing unit may be improved, and the operation speed may further increase. When all computations are completed, data in the register may be an obtained result. In some examples, an adder may also be turned off during a computation when data to be computed (a, b terminals) and carry input ($C_{in}$ terminal) input to the adder are all 0, so as to save power.

Figure 6:
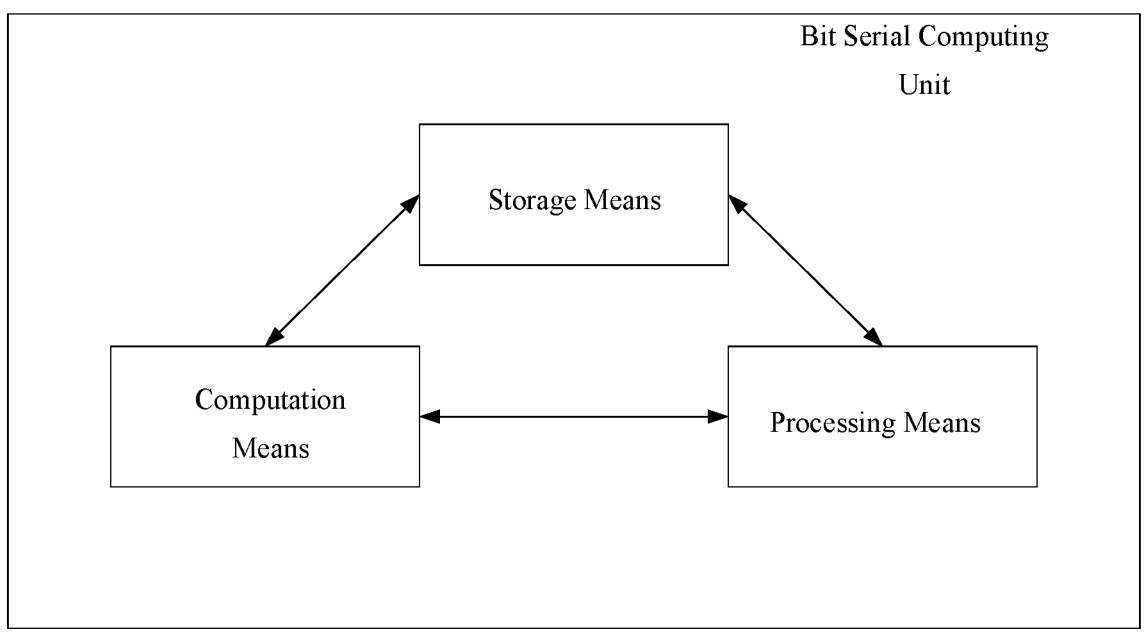
FIG. 6 is a block diagram of a bit serial computing unit in a processing device with dynamically configurable computation bit width of the present disclosure.

The bit serial computing unit used in the example of the present disclosure, such as a basic multiplier or the like, as shown in FIG. 6, may include a computation means, a processing means, and a storage means. The computation means may be configured to perform multiplication and/or addition on data of one or more bits, and input data to be computed may be data from the storage means and/or the data after being processed by the processing means, and a computation result output may be directly transmitted into the storage means to be stored, or may be transmitted to the processing means to be processed. The processing means may be used to perform processing such as data shifting, expanding/reducing data bit width according to a given rule, modifying one or more bits of data according to a given rule, or the like. Data to be processed by the processing means may be from the computation means and/or storage means, and the processed data may be transmitted to the computation means and/or the processing means. The storage means may be configured to store data including data to be computed, intermediate computation results, final computation results, and the like. The storage means here may be an on-chip caching unit (cache, buffer, or scratch pad). Each unit may further be subdivided into a plurality of units according to different functions thereof. For instance, the computation means may be subdivided into a multiplication unit, an addition unit, and the like. A specific example of the multiplier in the bit serial computing unit may include a first basic multiplier shown by FIG. 7, a second basic multiplier shown by FIG. 8, and a sparse multiplier device shown by FIG. 9.

Figure 7:
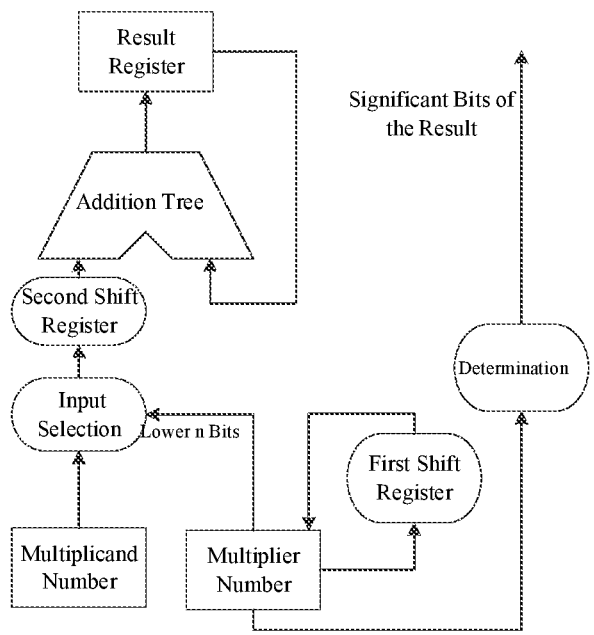
FIG. 7 is a structural schematic diagram of a first basic multiplier device provided in an example of the present disclosure.

FIG. 7 is a schematic diagram of a specific example of a bit serial computing unit of the present disclosure, where the bit serial computing unit may include: a first basic multiplier device which may be capable of satisfying the requirement for dynamically configurable computation bit width. The first basic multiplier may be used in the device of the present disclosure. As shown in FIG. 7, for M bits of multiplicand number and N bits of multiplier number, M and N both may both be positive integers. The positions of the multiplier number and the multiplicand number may be exchanged under the control of a control module. Lower n bits of the multiplier number (n is a positive integer, and $1 \leq n \leq N$, optionally $1 \leq n \leq N$, which may further improve computation parallelism, make better use of hardware resources, and speed up the computation) may be input into an input selection circuit, and the lower n bits of the multiplier number may be respectively subject to AND operation with the multiplicand number, which in other words, refers to that if a bit value of the multiplier number is 1, the multiplicand number itself may be output, otherwise 0 may be output. At the same time, the multiplier number may be sent to the first shift register for shifting to shift the lower n bits out, and then what input into the input selection circuit may be new lower n bits. The selection result of the input selection circuit may be input up to a second shift register for corresponding shifting, and then sent to the addition tree for addition. What subject to the addition computation here may be data that has undergone input selection and shifting and a result of a previous addition computation. The obtained result may be stored as an intermediate result in a result register. When the multiplicand number is subject to input selection and shifting next time, the result register may read the intermediate result and transmits it to the addition tree (device) to perform addition. When all bits of the multiplier number are 0, the multiplication computation may end.

To more clearly show a computation flow of the first basic multiplier, a specific example is given here, a multiplicand number is assumed to be 10111011, in other words, M=8, and a multiplier number is assumed to be 1011, in other words, N=4.

When n=2, in other words, each time 2 bits are shifted, a computation process is as follows: first, lowest 2 bits of the multiplier number, 11, may be taken out, and sent to the input selection circuit together with the multiplicand number. It may be the multiplicand number itself that is selected and is sent to the first shift register, and it may be unnecessary to shift the selected multiplicand number corresponding to the lowest bit, which is, 10111011, and the selected multiplicand number corresponding to a next lower bit may be shifted to the left by 1 bit, which is 101110110, and sent to the addition tree. Since there is no previous data addition, it is the sum of 10111011 and 101110110 that may be sent to the result register, which is, 1000110001. Then, the multiplier may be shifted to the right by 2 bits and then lowest 2 bits, which is 10, may be sent to the input selection circuit together with the multiplicand number to obtain 0 and 10111011, and then by the second shift register, 0 is still 0 after being shifted to the left by 2 bits, and 10111011 is shift to the left by 3 bits to become 10111011000, which may be sent to the addition tree together with 1000110001 in the result register to undergo computations, to obtain 100000001001, which may be sent to the result register. At this time, the multiplier number may be shifted to the right by 2 bits, all of which are 0, in other words, the computation may end, and it is the final computation result that is in the result register, which is 100000001001.

Figure 8:
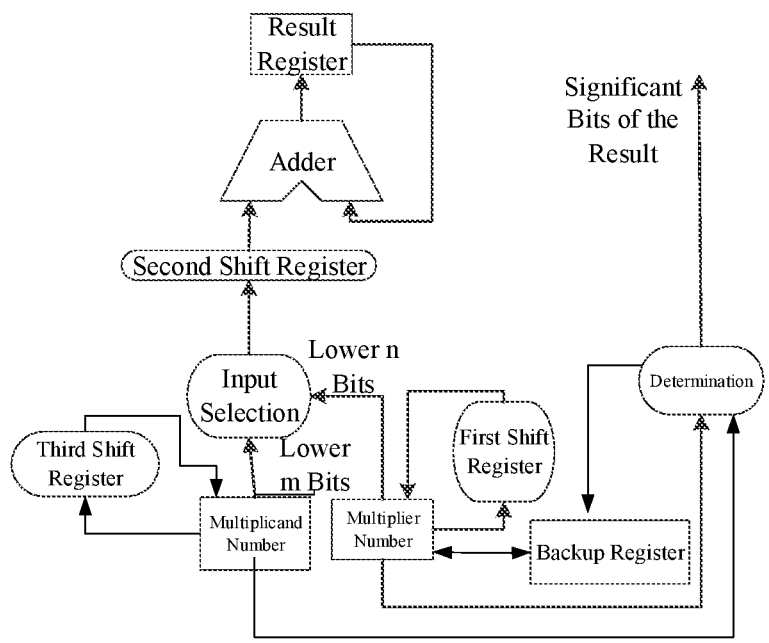
FIG. 8 is a structural schematic diagram of a second basic multiplier device provided in an example of the present disclosure.

FIG. 8 is a schematic diagram of a second basic multiplier device used for the present device of another example of the present disclosure, which may be capable of satisfying the requirement for dynamically configurable computation bit width. As shown in FIG. 8, for M bits of multiplicand number and N bits of multiplier number, M and N may both be positive integers. In the second basic multiplier device, positions of the multiplier number and the multiplicand number may be exchanged under the control of a control module. Lower m bits of the multiplicand number (m is a positive integer, and $1 \leq m \leq M$) may be input into an input selection circuit, and lower n bits of the multiplier number (n is a positive integer, and $1 \leq n \leq N$) are input into the input selection circuit. The lower m bits of the multiplicand number may be subject to multiplication with the lower n bits of the multiplier number respectively. And the multiplier number may be sent to the first shift register for shifting to shift the lower n bits out, and then what input into the input selection circuit may be new lower n bits. The result of the input selection may be input up to a second shift register for corresponding shifting, and then sent to the addition tree for addition. What subject to the addition computation here may be the data that has undergone input selection and shifting, and a result of a previous addition computation. The obtained result may be stored as an intermediate result in a result register. When a next time the multiplicand number is subject to input selection and shifting, the result register may read the intermediate result and transmit it to the addition tree (adder) to perform addition. When all bits of the multiplier number are 0, the multiplicand number may be sent to a third shift register for shifting to shift the lower m bits out, and the multiplier number may be taken out of a backup register, and the above computation steps may be repeated. The multiplication computation may end until the multiplicand number and the multiplier number are both 0.

Figure 9:
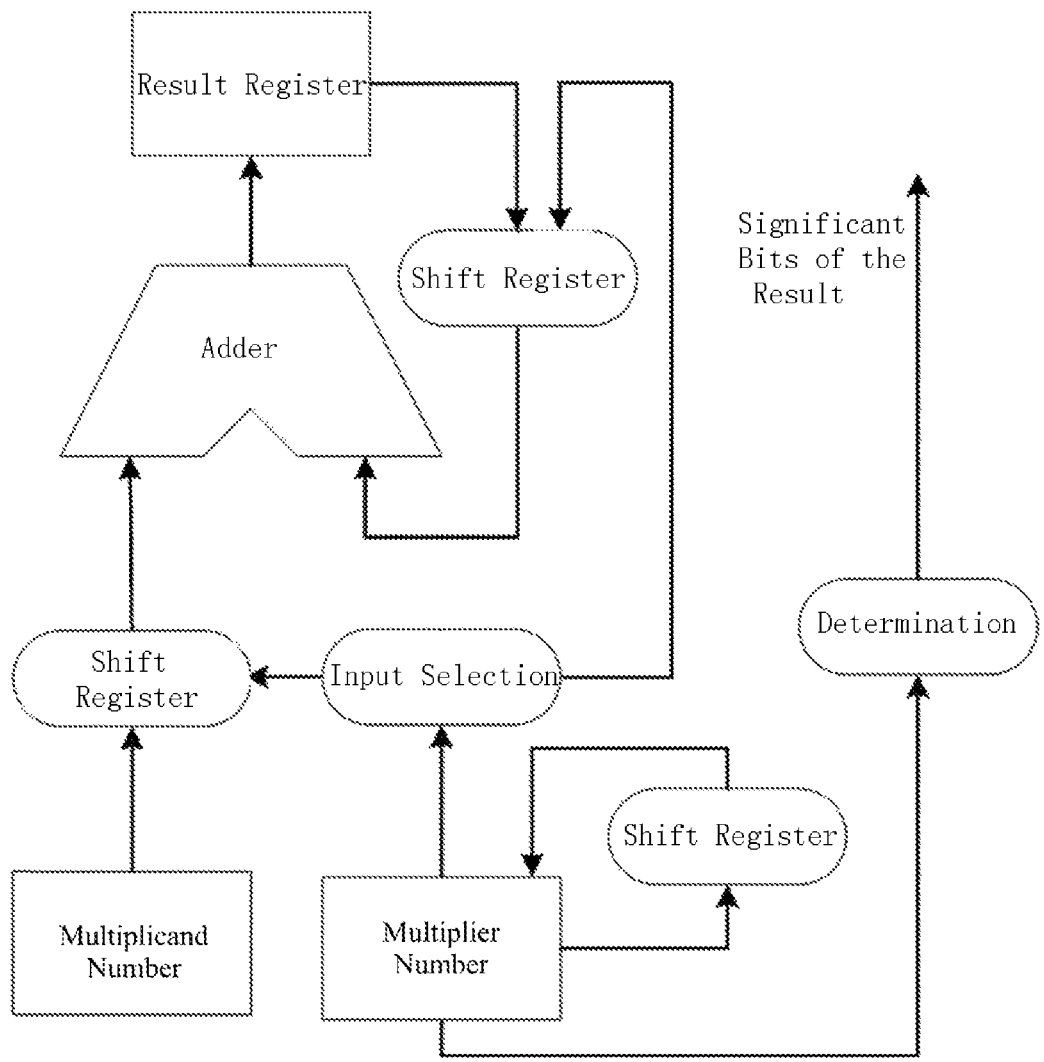
FIG. 9 is a structural schematic diagram of a sparse multiplier device provided in an example of the present disclosure.

FIG. 9 is a schematic diagram of a sparse multiplier device used in the present device provided in an example of the present disclosure, which may be capable of satisfying the requirement for dynamically configurable computation bit width. The sparse multiplier may be used in a case of sparse computation, in other words, when 1 in a binary representation of the multiplier number or multiplicand number is sparse, then a position of 1 in the multiplier number or multiplicand number may be sparsely represented, which may further improve the effectiveness of the computation and may speed up the computation. As shown in FIG. 9, for M bits of multiplicand number and N bits of multiplier number, M and N may both be positive integers. In other words, numbers of bits of the multiplicand number and the multiplier number here may or may not be equal. Here, the multiplier number is represented in a sparse method, in other words, the position of 1 in the multiplier number is represented by means of absolute or relative position. Here, the computation modules of the sparse multiplier provided in this example may all be configurable, so when a computation is performed using different representation methods, the devices inside the computing unit may be configured according to needs. For instance, if shifting is unnecessary for the result register upon addition computation, a shift register connected to the result register may be configured to be inactive, and at this time shift information of the multiplier number may also not be transferred to the shift register. It can be understood by one skilled in the art that relevant details can be adjusted as needed to complete relevant specific details, such as shifting of the multiplicand number and addition computation of the result.

To more clearly show a computation flow of the sparse multiplier, a specific example is given here. A multiplicand number is assumed to be 10111011, in other words, M=8, and a multiplier number is assumed to be 00100010, in other words, N=8. When the multiplier number is represented in an absolute representation manner, a position of 1 in the multiplier number may be represented by an absolute position. A rightmost bit of the number is referred to as a zero-th bit here, a bit left to the zero-th bit is called a first bit, and so on. Then, the multiplier number is expressed as (1, 5). At the same time, it is required that the shift register connected to the result register in this example does not work, and data of the multiplier number does not need to be transferred to the shift register. Then a first number of multiplier number may be taken out first, which is 1, indicating that there is a 1 at the first bit. The multiplicand number may be sent to the shift register, and shifted by 1 bit to become 101110110 which is sent to the adder. Since previous numbers are added, a result sent to the result register may be 101110110. Then, a position of a next 1 of the multiplier number, in other words, 5, may be taken out, and sent to the shift register together with the multiplicand number. In the shift register, the multiplicand number may be shifted right by 5 bits to obtain 1011101100000, which may be sent to the adder. Meanwhile, the result 101110110 in the result register may be taken out. Since shifting is unnecessary for the used absolute representation method, the result can be directly sent to the adder for addition to obtain 1100011010110. The result of the addition may again be sent to the result register. At this point, 1 of the multiplier number has all been computed, so the computation may end. The multiplier number may also be represented in a relative manner, and a representation thereof may be defined as a number of bits between each two non-zero digits from a first non-zero digit from a highest (leftmost) bit to a lowest bit. For 00100010, there are 4 bits between the first digit that is not 0 and the next digit that is not 0, and there is one bit between the second digit that is not 0 and the lowest digit, so 00100010 may be expressed as (4, 1). Here, it is required that the shift register connected to the result register and that connected to the multiplicand number in this example both need to operate. First, a first digit 4 of the multiplier number may be taken out and sent to the two shift registers. Then the multiplier may be shifted to the right by 4 bits and sent to the adder together with the data in the result register which has been shifted to the right by 4 bits, to undergo addition computation. At this time, the data in the result register is 0, so the addition result 101110110000 may be obtained and sent to the result register for saving. Then, a second digit 1 of the multiplier number may be taken out and sent to the shift register, to obtain 101110110 and 1011101100000, which may be sent to the adder for addition, to obtain a result 1100011010110. The result may again be sent to the result register. At this point, 1 in the multiplier number has all been computed, so the computation may end. In this way, the sparseness of data may be effectively utilized, and only efficient computation, which is computation between non-zero data may be performed, and may thereby reduce non-effective computation, speed up computation, and improve the performance-to-power ratio.

Figure 10:
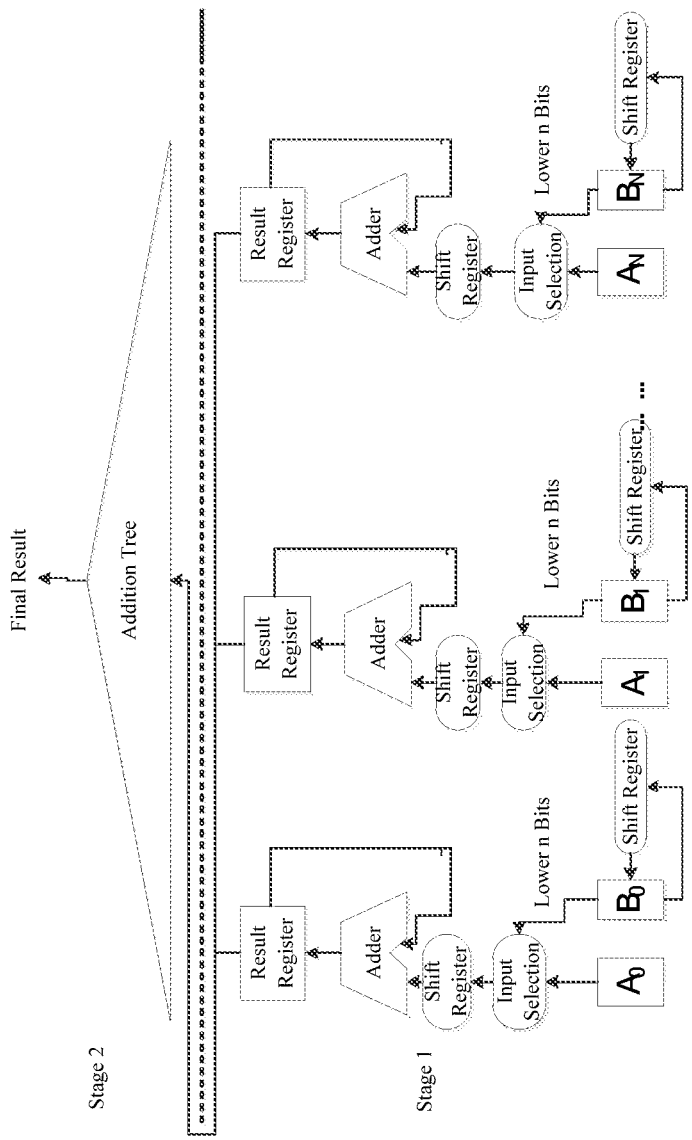
FIG. 10 is a structural schematic diagram of a device for performing vector multiplication by a basic multiplier or a sparse multiplier provided in an example of the present disclosure.
Figure 11:
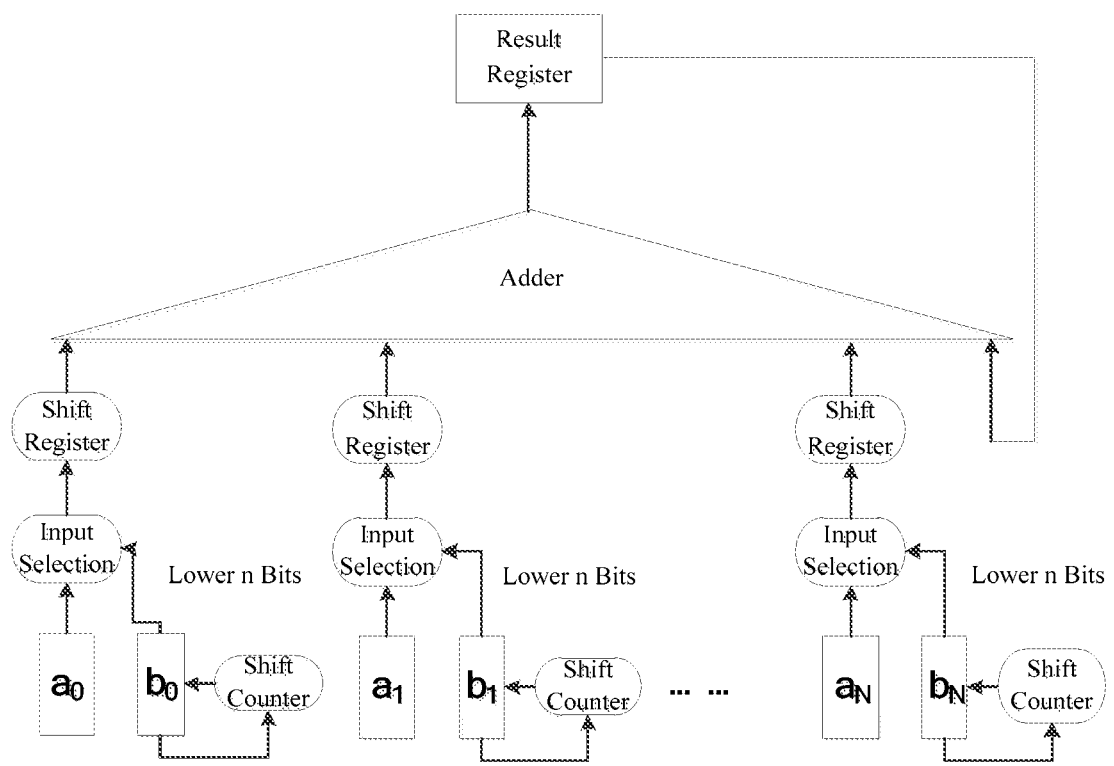
FIG. 11 is a structural schematic diagram of a device for performing vector multiplication by a fused vector multiplier provided in an example of the present disclosure.

FIG. 10 is a schematic diagram of a device for performing vector multiplication by a fused vector multiplier provided in an example of the present disclosure. Here, it is assumed that an inner product of vectors $\vec{A}$ $\{A_N \ldots A_2 A_1 A_0\}$ and $\vec{B}$ $\{\vec{B}_N \ldots B_2 B_1 B_0\}$ is to be computed, and data of a corresponding dimension is sent to the multiplier for computation, as shown in FIG. 11. Here, it is required that dimensions of $\vec{A}$ and $\vec{B}$ are the same, and both are (N+1), but bit widths of respective dimensions are not necessarily the same. And it is meanwhile assumed that n bits are taken for computation each time, where n is a positive integer larger than 1 but not larger than a bit width of a dimension of B. First, lower n bits of $B_0$ may be sent together with $A_0$ to an input selection circuit, AND operations between the lower n bits of $B_0$ and $A_0$ may be performed respectively, and the result of the selection may be sent to a subsequent shift register for shifting. After the shifting, the result may be sent to an addition tree. In this process, each dimension may undergo the same operation as a first dimension. Then data sent from these dimensions may undergo addition by the addition tree, and a value in the result register may be sent to the addition tree to undergo addition computation together, and the obtained result of the addition may be sent to the result register. At the same time of the computation, a $B_i$ (i=0,1, . . . ,N) value of each dimension may be sent to the shift register and shifted to the right by n bits, and then the above operation may be repeated. In other words, lowest n bits of the shifted $B_i$ (i=0,1, . . . ,N) value and the corresponding $A_i$ (i=0,1, . . . ,N) value may be sent to the input selection circuit to undergo selection, and then may be sent to the shift register for shifting, and then may be sent to the addition tree to undergo addition computation. This process may be repeated until the $B_i$ (i=0, 1, N) values of each dimension are all 0, and the computation may end. At this time, the data in the result register may be the final result of the computation. The multiplier can flexibly configure the bit width of the data to be computed without the need to re-count the shifted bits of the multiplicand number each time a set of data multiplication is performed. At the same time, when a number of data bits is relatively low or a number of vector bits is relatively high, the characteristics of low bit width and high vector dimension of the data may be greatly utilized, and the process may be executed in parallel by means of pipeline, which may reduce the time required for computation, further speed up computation and improve the performance-to-power ratio.

Figures 12, 13:
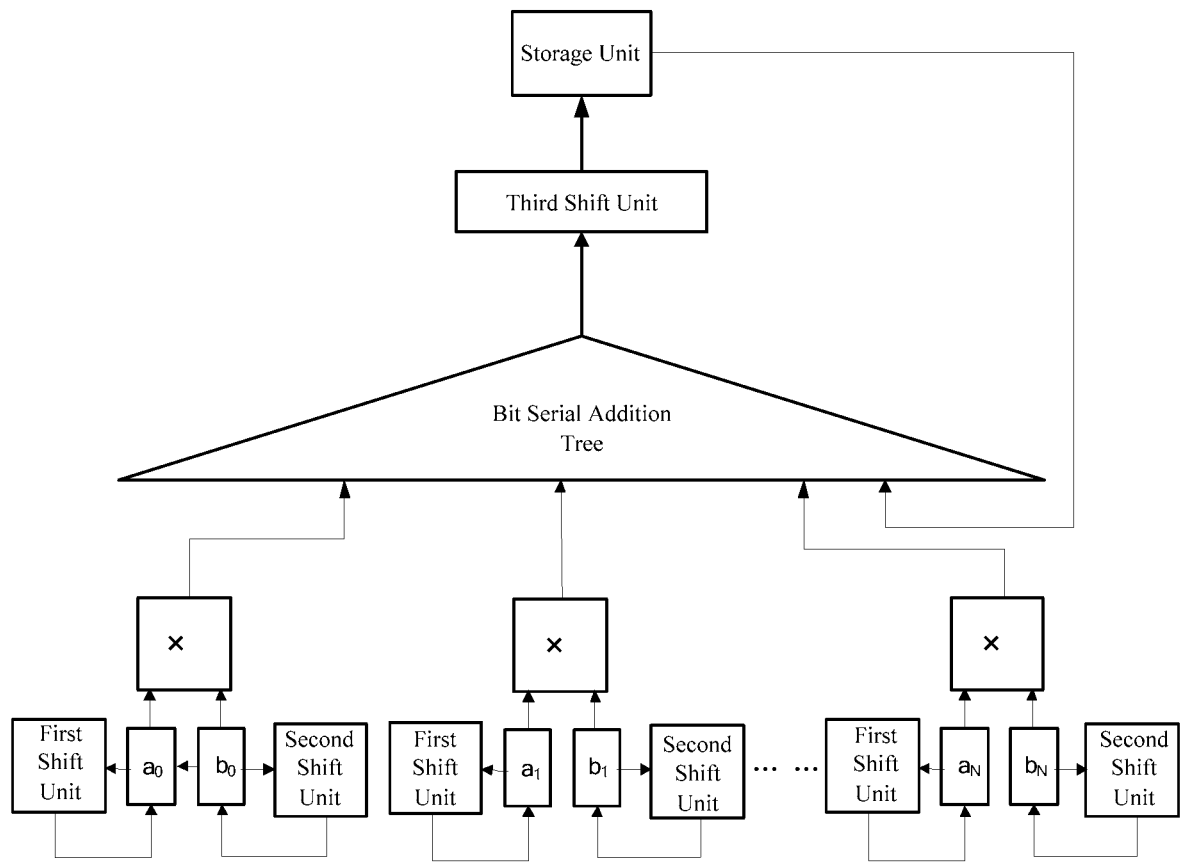
FIG. 12 is a structural schematic diagram of a specific implementation flow of a fused vector multiplier device and other multiplier devices provided by the present disclosure.
FIG. 13 is a schematic diagram showing the combination of a second basic multiplier and a bit serial addition tree according to one example of the present disclosure.

To more clearly illustrate a computation flow of the fused vector multiplier and differences and advantages of the computation flow of the multiplier over other multipliers, a specific example will be described with reference to FIG. 10, FIG. 11 and FIG. 12. First, it is assumed that dimensions of $\vec{A}$ and $\vec{B}$ are 8, in other words, N=7, $\vec{A}\{A_7 \ldots A_2A_1A_0\}$, $\vec{B}\{B_7 \ldots B_2B_1B_0\}$, and a bit width of $\vec{A}$ is 8 bits, in other words, each dimension of $\vec{A}$ is 8 bits, $A_i=\{a_{i7} \ldots a_{i1}a_{i0}\}$, where i=0,1, . . . ,7; $\vec{B}$ has a bit width of 4 bits, in other words, each dimension of $\vec{B}$ is 4 bits, $B_i=\{b_{i7} \ldots b_{i1}b_{i0}\}$, where i=0, 1, . . . , 7. Then the vector inner product $\vec{A} \cdot \vec{B} = A_7B_7+A_6B_6+A_5B_5+A_4B_4+A_3B_3+A_2B_2+A_1B_1+A_0B_0$.

In general, a computation flow using the basic multiplier or the above-described basic or sparse multiplier (assuming that n is 2, in other words, the multiplier number is shifted by 2 bits each time) may be divided into two stages: at first, products of respective components may be computed separately, and then they may be subject to summation, as shown in FIG. 10. Specifically, computation may be performed on a certain dimension of Ai and Bi, and the shift register may be cleared. In a first clock cycle, lowest two bits $B_{i0}$ and $b_{i1}$ of Bi may be taken and subject to input selection and shifting and may be transmitted to an adder to obtain a value of $A_i*b_{i0}b_{i1}$, and the shift register may be added by 2; in a second clock cycle, Bi may be shifted to the right by 2 bits, and lowest two bits may be taken to obtain lowest bits $b_{i2}$, $b_{i3}$, which may be subject to input selection and shifting to obtain $A_i*b_{i2}b_{i3}$; this result may be added to a previous product to obtain a final computation result $A_i*b_{i0}b_{i1}b_{i2}b_{i3}$, in other words, the final computation result $A_i*B_i$ of this dimension may be obtained. Computation of a next dimension may be performed. $A_{1+1}$ and $B_{1+1}$ may be input, and the shift register may be cleared, . . . until computation of each dimension is completed, to obtain $(A_0*A_0, A_1*B_1, \ldots, A_7*B_7)$. Computation in stage 1 may be completed. Then, in stage 2, the products may be sent to an addition tree for addition, to obtain a final result of the vector inner product, which in other words, may be $\vec{A} \cdot B$. In stage 1, one multiplier may be selected to compute each dimension in turn; multiple multipliers may also be provided to carry out parallel computation and complete computation of one dimension in one multiplier, as shown in FIG. 11 and FIG. 12. When multiple multipliers are used, a shift value of the multiplier number $B_i$ of each dimension may need to be recounted. The multiplier at this stage 1 may employ the first basic multiplier, the second basic multiplier, or the sparse multiplier described above.

The above-mentioned computation units may perform required computations in any combination. For instance, the second basic multiplier and the bit serial addition tree may be combined, as shown in FIG. 13, to perform vector multiplication. Here, it is assumed that an inner product value of vectors $\vec{A}\{A_N \ldots A_2A_1A_0\}$ and $\vec{B}\{B_N \ldots B_2B_1B_0\}$ is to be computed, and data of a corresponding dimension may be sent to the multiplier to wait for computation, as shown in FIG. 11. Here, it is required that dimensions of $\vec{A}$ and $\vec{B}$ are the same, and both are (N+1), but bit width of respective dimensions are not necessarily be the same, and it is meanwhile assumed that $\vec{A}$ is a multiplicand number and B is a multiplier number, in each computation, specified m bits of A may be taken and specified n bits of B may be taken to undergo computation, where m is a positive integer not larger than a bit width of one dimension of $\vec{A}$, and n is a positive integer not larger than a bit width of one dimension of $\vec{B}$. At first, lower m bits of $A_0$ and lower n bits of $A_0$ may be taken and multiplied in the multiplier, and the obtained selected result may be sent to the bit serial addition tree for addition. The result may be stored in a storage unit. Next, B may be shifted by n bits and multiplied with the lower m bits of A, and the result may be sent to the bit serial addition tree for addition, together with original data in the storage unit after undergoing shifting by a third shift unit, and the result may be stored in the storage unit. After all computations of B are completed, A may be shifted by m bits and again undergoes computation with the n bits of B in turn. When all computations end, the data in the storage unit may be a final result of the computation. The present multiplier may flexibly configure a bit width of data to be computed without saving intermediate data, which may thereby reduce the storage overhead, and speed up the computation. At the same time, when a number of data bits is relatively low or a dimension of the vector is relatively high, the characteristics of low bit width and high vector dimension of the data may be greatly utilized, and the process can be executed in parallel by means of pipeline, which may reduce the time required for computation, further speed up computation and improve the performance-to-power ratio.

To sum up, the device and the method of this example may significantly improve the computation speed of a neural network, and meanwhile may have dynamic configurability, meet related requirements of diversity of data bit width and dynamic variability of data bit width in a computation process, and may have the advantages of strong flexibility, high configurability, fast computation speed, low power consumption, and the like.

Figure 14:
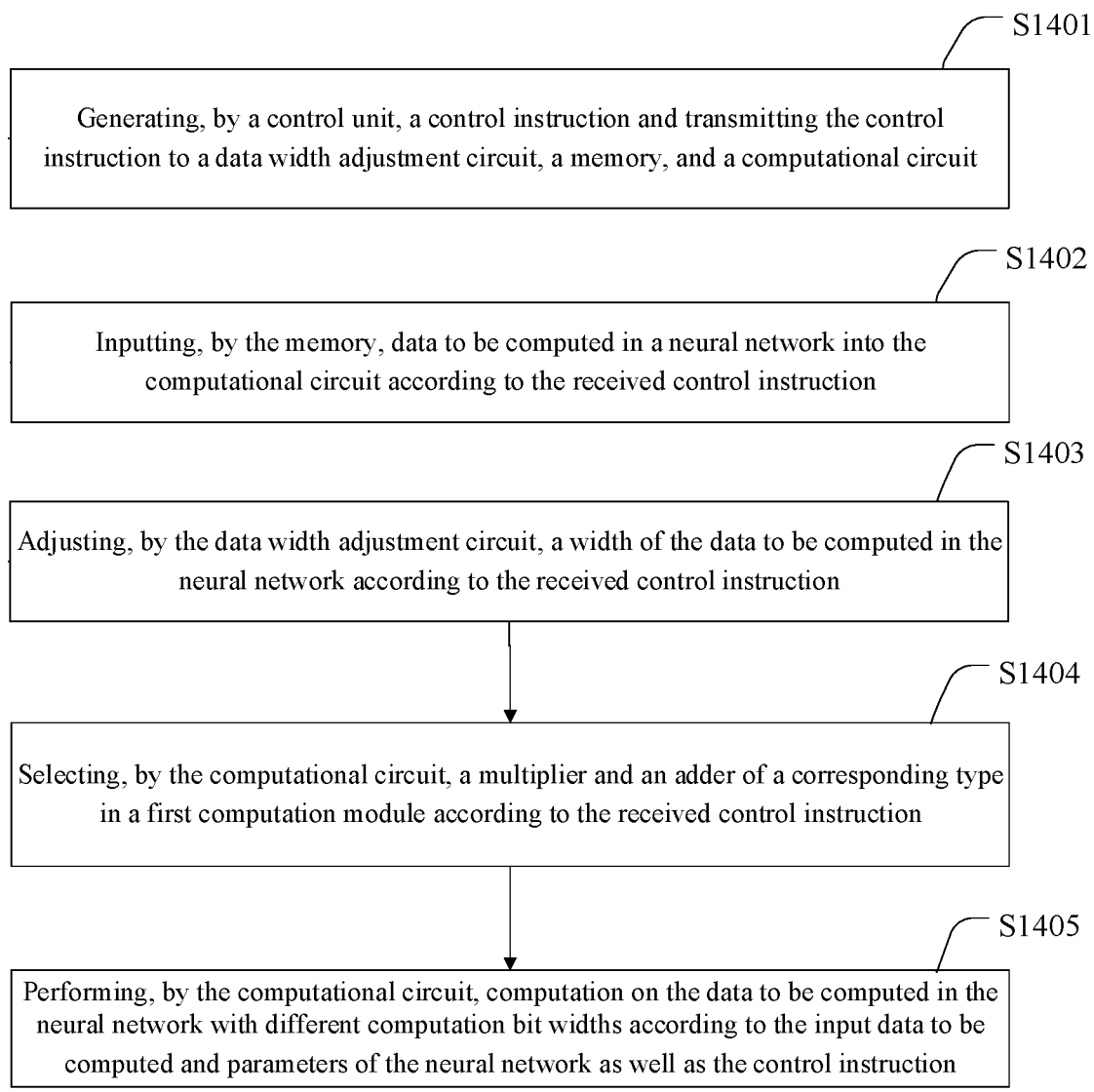
FIG. 14 is a flowchart of a processing method with dynamically configurable computation bit width provided by an example of the present disclosure.

According to another aspect of an example of the present disclosure, there is also provided a processing method of a processing device with dynamically configurable computation bit width, with reference to FIG. 14, which may include the following steps:

S1401 generating, by a control unit, a control instruction and transmitting the control instruction to a memory, a data width adjustment circuit, and a computational circuit;

S1402 inputting, by the memory, data to be computed in a neural network into the computational circuit according to the received control instruction;

S1403 adjusting, by the data width adjustment circuit, a width of the data to be computed, intermediate computation results, final computation results, and/or data to be cached according to the practical needs;

S1404 selecting, by the computational circuit, a multiplier and adder circuit bit serial computing unit of a corresponding type according to the received control instruction; and S1405 performing, by the computational circuit, computations on the data to be computed with different computation bit widths of the neural network according to the input data to be computed and parameters of the neural network as well as the control instruction.

In view of the foregoing, the data width adjustment circuit in the method of the example may be able to significantly improve the computation speed of the neural network, and may have dynamic configurability and satisfy relevant requirements of the diversity of data bit width and the dynamic variability of data bit width during computation.

Furthermore, the first computation module in step S1405 may include performing computations on the data to be computed in the neural network by using an adder circuit, a basic multiplier, a sparse multiplier, and/or a fused vector multiplier. By dynamically selecting a specific adder circuit, as well as a basic multiplier, a sparse multiplier, and/or a fused vector multiplier, the processing method may become flexible, configurable, have fast computation speed, low power consumption, as well as other features.

Hereinafter, an example of a processing device and a processing method with dynamically configurable computation bit width of another solution will be described. The solution introduced below will not include a data width adjustment circuit and functional units related to the data width adjustment circuit.

Figure 15:
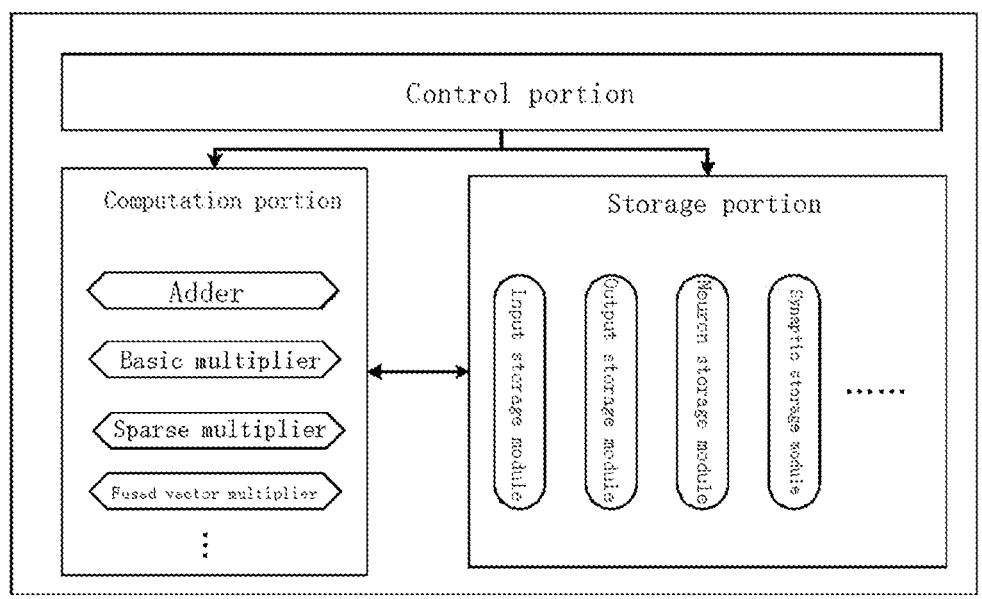
FIG. 15 is a structural schematic diagram of a processing device with dynamically configurable computation bit width provided in an example of the present disclosure.

FIG. 15 is a schematic diagram of a processing device provided in another example of the present disclosure. As shown in FIG. 15, this device may mainly include three parts: a control circuit, a computational circuit, and a memory. The control circuit may be configured to send a control signal to the computational circuit and the memory to control operation of them and coordinate data transmission between the two. For functions of respective parts, please refer to what described for respective parts in the example shown in FIG. 1, and details are not described herein.

Figure 16:
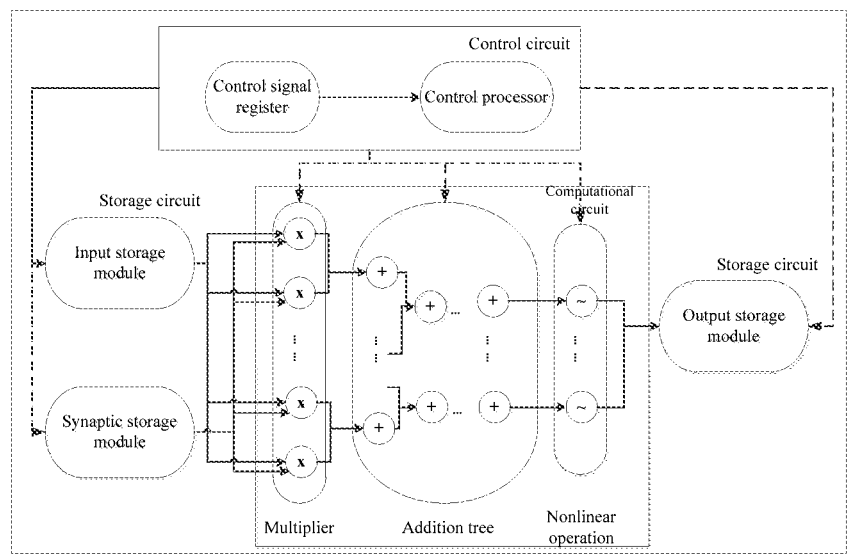
FIG. 16 is a structural schematic diagram of a processing device with dynamically configurable computation bit width provided in another example of the present disclosure.

FIG. 16 is a schematic diagram of a processing device provided in another example of the present disclosure. A structure shown in FIG. 16 is the same as the structure shown in FIG. 2 with the data width adjustment circuit removed. In other words, the memory may be directly connected to the computational circuit. For respective corresponding setting manners one can refer to the above. The three modules can be executed in parallel in a pipelined manner. The device may speed up a computation process of a convolutional neural network, reduce on-chip and off-chip data exchange, and save storage space.

Figure 17:
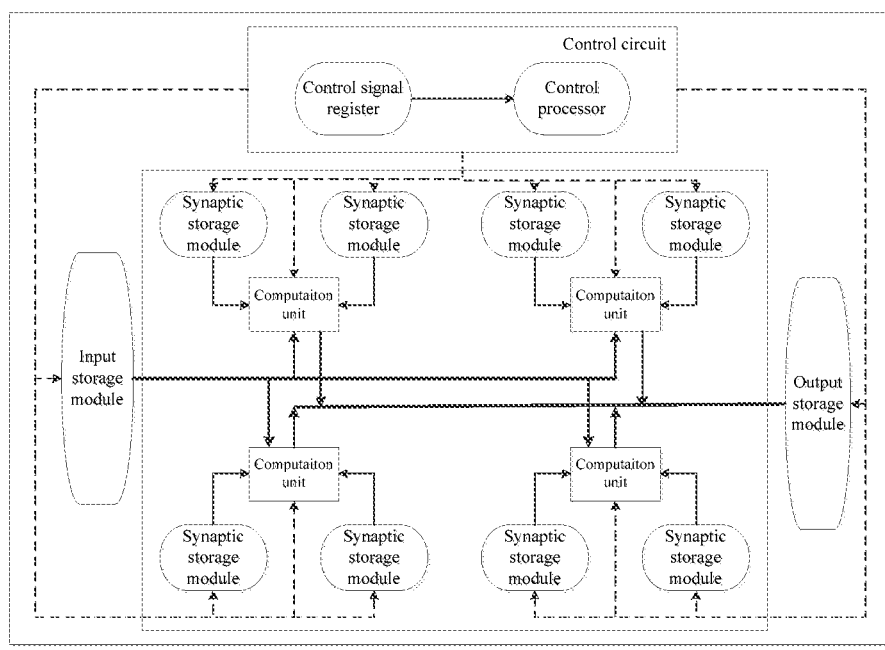
FIG. 17 is a structural schematic diagram of a processing device with dynamically configurable computation bit width provided in a further example of the present disclosure.

FIG. 17 is a schematic diagram of a processing device provided in yet another example of the present disclosure. A structure shown in FIG. 17 is similar as the structure shown in FIG. 3, except a difference that FIG. 17 does not include the relevant structure and connection relationship of the data width adjustment circuit. For respective connection relationship and realized functions in FIG. 17, please refer to description of the corresponding example of FIG. 3, and details are not described herein. The processing device of this example may significantly improve the computation efficiency in a large-scale computation with many parameters. The present device may effectively accelerate a computation process of a convolutional neural network, and may be especially suitable for large network scale with many parameters.

Figure 18:
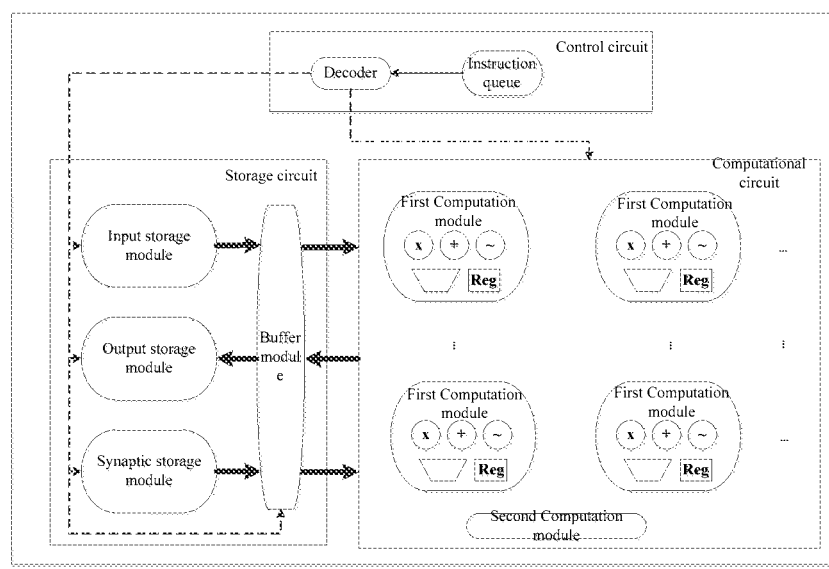
FIG. 18 is a structural schematic diagram of another example of a processing device with dynamically configurable computation bit width provided in yet another example of the present disclosure.

FIG. 18 is a schematic diagram of a processing device provided in a further example of the present disclosure. A structure shown in FIG. 18 is similar to the structure shown in FIG. 4, except a difference that FIG. 18 does not include the relevant structure and connection relationship of the data width adjustment circuit. For respective connection relationship and realized functions in FIG. 18, please refer to description of the corresponding example of FIG. 4, and details are not described herein.

Figure 19:
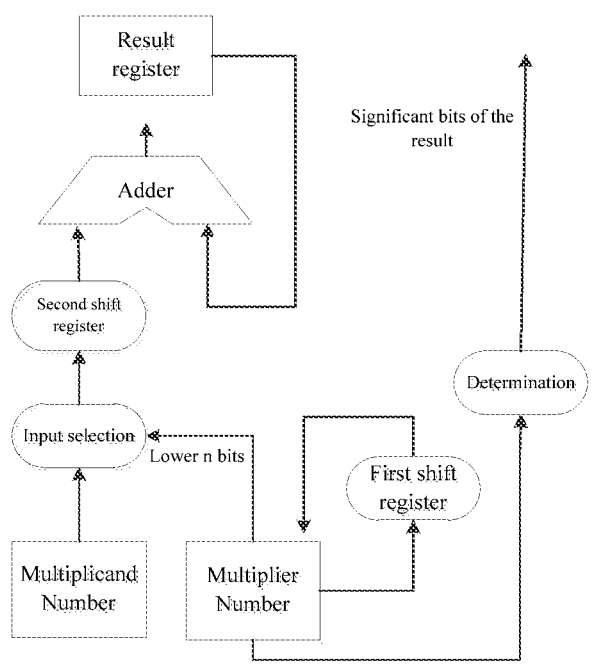
FIG. 19 is a structural schematic diagram of a basic multiplier device provided in an example of the present disclosure.

FIG. 19 is a schematic diagram of a basic multiplier device used in the device provided in an example of the present disclosure, which may be capable of satisfying the requirement of dynamically configurable computation bit width. As shown in FIG. 19, for M bits of multiplicand number and N bits of multiplier number, M and N may both be positive integers. In other words, the bits of the multiplicand number may be equal to or not equal to the bits of the multiplier number. Lower n bits of the multiplier number (n is a positive integer, and $1 \leq n \leq N$) may be input into the input selection circuit. AND operation may be performed between respective values at lower n bits of the multiplier number and the multiplicand number. In other words, if a value at a bit of the multiplier number is 1, the multiplicand number itself may be obtained; otherwise, 0 may be obtained. Meanwhile, the multiplier number may be sent to the first shift register for shifting to shift the lower n bits out, and what input into the input selection circuit next time may be new lower n bits. The result of the input selection may be input up to a second shift register for corresponding shifting, and then sent to the addition tree for addition. What subject to the addition computation here may be the data that has undergone input selection and shifting and the result of the previous addition computation. The obtained result may be stored as an intermediate result in a result register. When the multiplicand number is subject to input selection and shifting next time, the result register may read the intermediate result and transmit it to the addition tree (adder) to perform addition. When multiplier numbers are all 0, the multiplication computation ends.

To more clearly show a computation flow of the basic multiplier, a specific example is given here that a multiplicand number is assumed to be 10111011, in other words, M=8, and a multiplier number is assumed to be 1011, in other words, N=4.

When n=2, in other words, each time 2 bits are shifted, the computation process is as follows: first, lowest 2 bits of the multiplier number, 11, may be taken out, and are sent to the input selection circuit together with the multiplicand number. It may both be the multiplicand number itself that is selected and is sent to the second shift register, and it is unnecessary to shift the selected multiplicand number corresponding to the lowest bit, which is 10111011, and the selected multiplicand number corresponding to a next lower bit may be shifted to the left by 1 bit, in other words, 101110110, and may be sent to the addition tree. Since there is no previous data addition, it is the sum of 10111011 and 101110110 that may be sent to the result register, which is 1000110001. Then, the multiplier may be shifted to the right by 2 bits and then the lowest 2 bits, in other words, 10, may be sent to the input selection circuit together with the multiplicand number to obtain 0 and 10111011. Then, by the shift register, 0 is still 0 after being shifted to the left by 2 bits, and 10111011 is shift to the left by 3 bits to become 10111011000, which may be sent to the addition tree together with 1000110001 in the result register to undergo computation, to obtain 100000001001, which may be sent to the result register. At this time, the multiplier number may be shifted to the right by 2 bits, all of which are 0, so the computation ends, and it is the final computation result that is in the result register, which is 100000001001.

Figure 20:
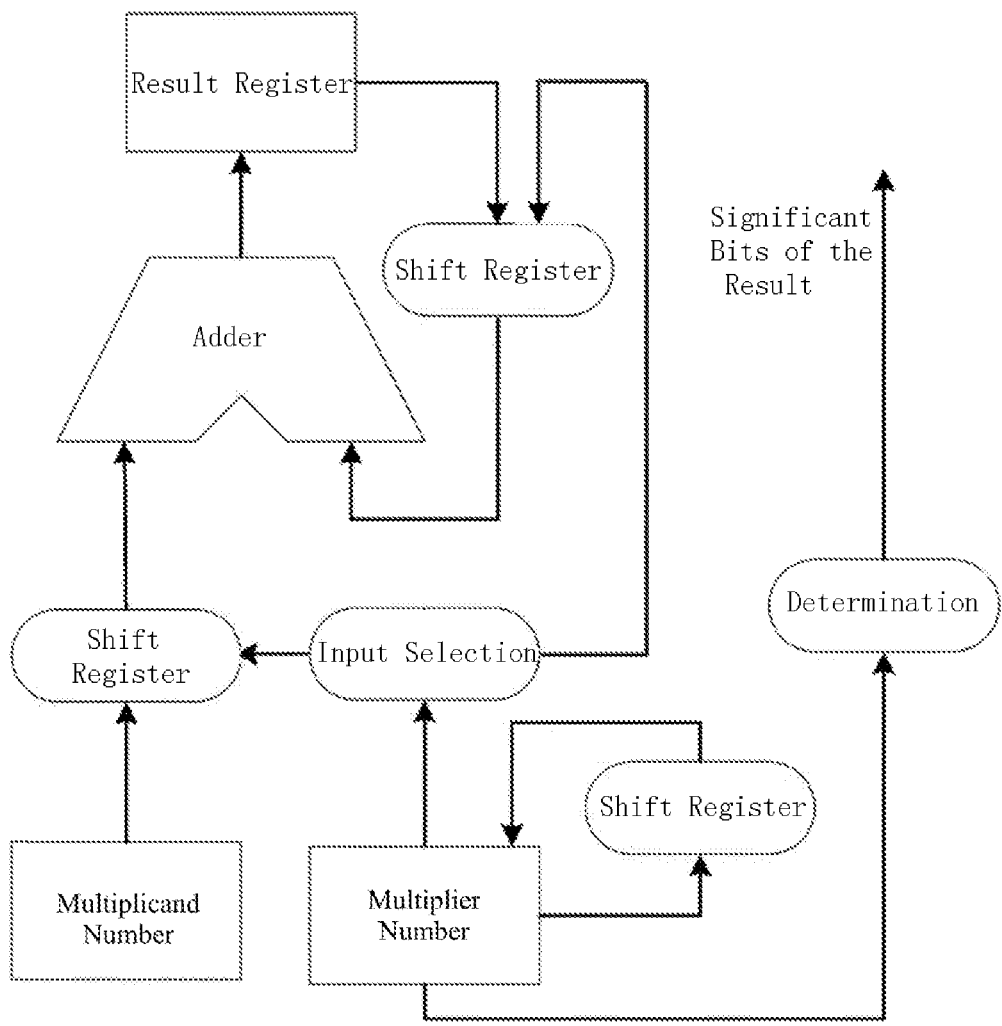
FIG. 20 is a structural schematic diagram of a sparse multiplier device provided in an example of the present disclosure.

FIG. 20 is a schematic diagram of a sparse multiplier device used in the present device provided in an example of the present disclosure, which is capable of satisfying the requirement for dynamically configurable computation bit width. As the name suggests, the sparse multiplier may be used for sparse computations. In other words, when a position of 1 is represented by means of sparse representation by the multiplier number or multiplicand number, it may further be able to improve the effectiveness of computation and speed up computation. As shown in FIG. 20, for M bits of multiplicand number and N bits of multiplier number, M and N may both be positive integers. In other words, a number of bits of the multiplicand number and the multiplier number here may or may not be equal. Here, the multiplier number may be represented in a sparse method, which means that the position of 1 in the multiplier number may be represented by means of absolute or relative position. Here, the computational circuit may be configurable, so when the computation is performed by using different representation methods, the devices inside the computation unit can be configured according to requirements. For instance, when shifting is unnecessary for the result register upon addition computation, a shift register connected to the result register can be configured to be inactive at this time, and shift information of the multiplier number can also not be transferred to the shift register. It can be understood by one skilled in the art that relevant details can be adjusted as needed to complete relevant specific details such as the shift of the multiplicand number and the addition of the result.

To more clearly show the computation flow of the sparse multiplier, a specific example is given here. A multiplicand number is assumed to be 10111011, in other words, M=8, and a multiplier number is assumed to be 00100010, in other words, N=8. When the multiplier number is represented in an absolute representation manner, a position of 1 in the multiplier number is represented by an absolute position. It is assumed that a rightmost bit of a number is called a 0th bit, a left bit to the 0th bit is called a 1st bit, and so on. Then, the multiplier number may be expressed as (1, 5). At the same time, it is required that the shift register connected to the result register in this example does not work, and data of the multiplier number does not need to be transferred to the shift register. Then a first number of multiplier number may be taken out first, which is 1, indicating that there is a 1 at the first bit. The multiplicand number may be sent to the shift register, and shifted by 1 bit to become 101110110, which may be sent to an adder. Since previous numbers are added, the result sent to the result register is 101110110. Then, a position of a next 1 of the multiplier number, in other words, 5, may be taken out, and be sent to the shift register together with the multiplicand number. In the shift register, the multiplicand number may be shifted right by 5 bits to obtain 1011101100000, which may be sent to the adder. Meanwhile, the result 101110110 in the result register may be taken out. Since shifting is unnecessary for the used absolute representation method, the result can be directly sent to the adder for addition to obtain 1100011010110. The result of the addition may again be sent to the result register. At this point, all 1 of the multiplier number have been computed, so the computation may end. If the multiplier number is expressed in a relative manner, a representation of the multiplier number may be defined as a number of bits between each two digits that are not 0 from first digit that is not 0 at a highest bit (leftmost) to a lowest bit. For 00100010, there are 4 bits between the first digit that is not 0 and a next digit that is not 0, and there is one bit between a second digit that is not 0 and the lowest digit, so it may be expressed as (4, 1). Here in this example, it is required that the shift registers connected with the result register and with the multiplicand number all operate. First, the first digit 4 of the multiplier may be taken out and sent to the two shift registers. Then the multiplier number may be shifted to the right by 4 bits and sent to the adder together with the data in the result register that is shifted to the right by 4 bits, to undergo accumulation. At this time, data in the result register is 0, so the addition result 101110110000 may be obtained, and sent to the result register. Then, the second digit 1 of the multiplier number may be taken out and sent to the shift register, to obtain 101110110 and 1011101100000, which may be sent to an adder for accumulation, to obtain a result 1100011010110. The result may again be sent to the result register. At this point, all 1 in the multiplier number have been computed, so the computation may end. In this way, the sparseness of data may be effectively utilized, and only efficient computation may be performed, in other words, computation between non-zero data may be performed, which may thereby reduce non-effective computation, speed up computation, and improve the performance-to-power ratio.

Figure 22:
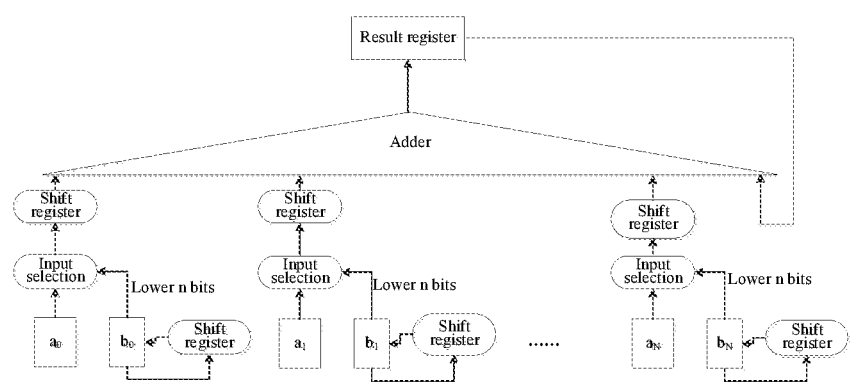
FIG. 22 is a structural schematic diagram of a device for performing vector multiplication by a fused vector multiplier provided in an example of the present disclosure.

FIG. 22 is a schematic diagram of a device for performing vector multiplication by a fused vector multiplier provided in an example of the present disclosure. Here, it is assumed that an inner product of vectors $\vec{A}\{A_N \ldots A_2A_1A_0\}$ and $\vec{B}\{B_N \ldots B_2B_1B_0\}$ is computed, and data of a corresponding dimension may be sent to the multiplier for computation, as shown in FIG. 8. Here, it is required that dimensions of $\vec{A}$ and $\vec{B}$ are the same, and both are (N+1), but bit widths of respective dimensions are not necessarily be the same. It is meanwhile assumed that n bits may be taken for computation each time, where n may be a positive integer representing a bit width larger than 1 but not larger than a bit width of one dimension of $\vec{B}$. First, lower n bits of $A_0$ may be sent together with $A_0$ to an input selection circuit, the AND operation between the lower n bits of $B_0$ and $A_0$ may be performed, and the result of the selection may be sent to a subsequent shift register for shifting. After the shifting, the result may be sent to an addition tree. In this process, each dimension may undergo the same computation as a first dimension. Then data sent from these dimensions may undergo addition by the addition tree, a value in the result register may be sent to the addition tree to undergo addition computation together, and the obtained result of the addition may be sent to the result register. At the same time of computation, a $B_i$ (i=0,1, ..., N) value of each dimension may be sent to the shift register and shifted to the right by n bits, then the above computation may be repeated, in other words, lowest n bits of the shifted B, (i=0,1, ..., N) value and corresponding $A_i$ (i=0,1, ..., N) may be sent to the input selection circuit to undergo selection, and then be sent to the shift register for shifting, and then be sent to the addition tree to undergo addition computation. This process may be repeated until the $B_i$ (i=0, 1, N) values of respective dimensions are all 0, and the computation may end. At this time, data in the result register may be a final result of the computation. The multiplier may be able to flexibly configure a bit width of data to be computed without the need to re-count shifted bits of a multiplicand number each time a set of data multiplication is performed. At the same time, when a number of data bits is relatively low or a number of vector dimensions is relatively high, characteristics of low bit width and high vector dimension of the data may be greatly utilized, and the process may be executed in parallel by means of pipeline, which may reduce the time required for computation and further speed up computation, and improve the performance-to-power ratio.

Computation of inner product of vectors can be accomplished in a variety of ways, as explained with reference to FIG. 21, FIG. 22, and FIG. 23. First, it is assumed that dimensions of $\vec{A}$ and $\vec{B}$ are 8, in other words, N=7, $\vec{A}$ $\{A_7 \ldots A_2 A_1 A_0\}$, $\vec{B}\{B_7 \ldots B_2 B_1 B_0\}$, and a bit width of $\vec{A}$ is 8 bits, in other words, each dimension of $\vec{A}$ is 8 bits, in other words, $A_i=\{a_{i7} \ldots a_{i1} a_{i0}\}$, where i=0,1, ..., 7; $\vec{B}$ has a bit width of 4 bits, in other words, each dimension of $\vec{B}$ is 4 bits, in other words, $B_i=\{b_{i3} b_{i2} b_{i1} b_{i0}\}$, where i=0, 1, ..., 7. Then the vector inner product $\vec{A} \cdot \vec{B} = A_7 B_7 + A_6 B_6 + A_5 B_5 + A_4 B_4 + A_3 B_3 + A_2 B_2 + A_1 B_1 + A_0 B_0$.

Figure 21:
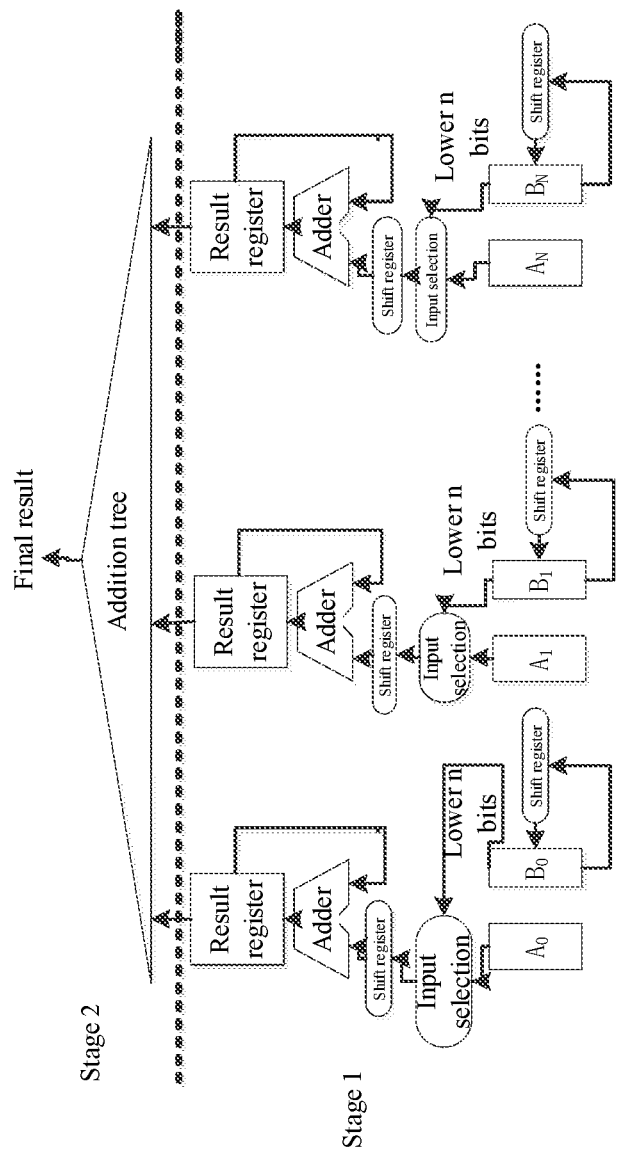
FIG. 21 is a structural schematic diagram of a device for performing vector multiplication by a basic multiplier or a sparse multiplier provided in an example of the present disclosure.

A computation flow using a basic multiplier or the above-described basic or sparse multiplier (assuming that n is 2, in other words, a multiplier number is shifted by 2 bits each time) may be divided into two stages: at first, products of respective components may be computed separately, and then they may be subject to summation, as shown in FIG. 21. Specifically, for computation of Ai and Bi in a certain dimension, the shift register may be cleared. In a first clock cycle, lowest two bits bi0 and bi1 of Bi may be taken, subject to input selection and shifting and may be added to an adder, to obtain a value of $Ai*b_{i0} b_{i1}$, and the shift register may be added by 2; in a second clock cycle, Bi may be shifted to the right by 2 bits, and lowest two bits may be taken to obtain lowest bits $b_{i2}$, $b_{i3}$, which may be subject to input selection and shifting to obtain $Ai*b_{i2} b_{i3}$; this result may be added to the previous product to obtain a final computation result $Ai*b_{i0} b_{i1} b_{i2} b_{i3}$, in other words, the final computation result $Ai*Bi$ of this dimension may be obtained. Computation of a next dimension may be performed. $A_{i+1}$ and $B_{i+1}$ may be input, and the shift register may be cleared . . . until computation of each dimension is completed, to obtain $(A_0*B_0, A_1*B_1, \ldots, A_7*B_7)$. The computation in stage 1 may be completed. Then, in stage 2, the products are sent to an addition tree for addition, to obtain a final result of vector inner products, in other words, $\vec{A} \cdot \vec{B}$. In stage 1, one multiplier can be selected to compute each dimension in turn; multiple multipliers may also be provided to carry out parallel computation and complete computation of one dimension in one multiplier, as shown in FIG. 11 and FIG. 7. When multiple multipliers are used, the shift value for the multiplier number $B_i$ in each dimension may need to be recounted. The multiplier at this stage may be the basic multiplier or the sparse multiplier described above.

A fused vector multiplier may be used to perform an overall lateral accumulation computation, and a structure of the multiplier is as shown in FIG. 22. After a product of one component of each dimension is computed, it may be sent to an addition tree for accumulation, until the computation is completed, and a final result is obtained. For instance, a computation flow is as shown in the elliptical box of FIG. 23. In a first clock cycle, a product of $A_i*b_{i0}$ (i=0, 1, . . . , 7) may be obtained by computation for each dimension and sent to the addition tree for accumulation. The computation result may be sent to a result register, and a shift register may be added by 1; in a second clock cycle, computation may be performed for each dimension according to the shift register to obtain a product of $2*A_i*b_{i1}$ (i=0, 1, . . . , 7), which may be sent to the addition tree for accumulation together with the data in the result register, and the shift register may be added by 1; in a third clock cycle, computation may be performed for each dimension according to the shift register to obtain a product of $4*A_i*b_{i2}$ (i=0, 1, . . . , 7), which may be sent to the addition tree for accumulation together with the data in the result register, and the shift register may be added by 1; finally, in a fourth clock cycle, a product $8*A_i*b_{i3}$ (i=0, 1, . . . , 7) may be obtained by computation, and it may be sent to the addition tree for accumulation together with the data in the result register, to obtain a final result. Therefore, a desired result may be acquired after 4 computation cycles, and shifting may be performed for three times during the computation process. In contrast, for an ordinary multiplier, shifting operation is necessary for the computation of every data, in other words, in the case of four operands, a total of 4*3=12 shifting operations may be required. Therefore, our design, by changing an order of computation, may greatly reduce counting operation of a shift value and may thereby effectively improve the performance-to-power ratio.

According to another aspect of an example of the present disclosure, there is also provided a processing method with dynamically configurable computation bit width, with reference to FIG. 24, which may include the following steps:

S2400 generating, by a control unit, a control instruction and transmitting the control instruction to a memory and a computational circuit;

S2401 inputting, by the memory, data to be computed in a neural network into the computational circuit according to the received control instruction;

S2402 selecting, by the computational circuit, a multiplier and an adder circuit of a corresponding type in a first computation module according to the received control instruction;

S2403 performing, by the computational circuit, computation of the data to be computed in the neural network with different computation bit widths according to the input data to be computed and parameters of the neural network as well as the control instruction.

Furthermore, the first computation module in step S2403 may include performing computation on the data to be computed in the neural network by using an adder, and a basic multiplier, a sparse multiplier, and/or a fused vector multiplier.

To sum up, the processing device and method may significantly improve the computation speed of the neural network, and meanwhile have dynamic configurability, satisfy related requirements of diversity of data bit width and dynamic variability of data bit width in a computation process, and have technical effects of strong flexibility, high configurability, fast computation speed, low power consumption, and the like.

Some examples further disclose a chip, which may include the aforesaid processing device.

Some examples further disclose a chip package structure, which may include the aforesaid chip.

Some examples further disclose a board card, which may include the aforesaid chip package structure.

An example further discloses electronic apparatus, which may include the aforesaid board card.

The electronic apparatus may include, but is not limited to, robots, computers, printers, scanners, tablets, smart terminals, mobile phones, driving recorders, navigators, sensors, webcams, cloud servers, cameras, video cameras, projectors, watches, headphones, mobile storage, wearable apparatuses, vehicles, household appliances, and/or medical equipment.

The vehicles may include airplanes, ships, and/or cars; the household appliances may include televisions, air conditioners, microwave ovens, refrigerators, rice cookers, humidifiers, washing machines, electric lamps, gas stoves, and range hoods; the medical equipment may include nuclear magnetic resonance instruments, B-ultrasound instruments, and/or electrocardiographs.

In the examples provided by the present disclosure, it should be understood that the related device and method disclosed may be implemented in other manners. For instance, the device examples described above are merely illustrative. For instance, the division of the part or module is only a logical function division. In actual implementation, there may be another division manner, for instance, multiple parts or modules may be combined or may be integrated into one system, or some features can be ignored or not executed.

In the present disclosure, the term "and/or" may have been used. As used herein, the term "and/or" means one or the other or both (e.g., the phrase "A and/or B" means "A or B", or "both A and B").

In the above description, for purposes of explanation, numerous specific details are set forth in order to provide a thorough understanding of various examples of the present disclosure. However, it will be obvious for a person skilled in the art that one or more other examples can also be implemented without some of these specific details. The specific examples described are not intended to limit the present disclosure but to illustrate it. The scope of the present disclosure is not to be determined by the specific examples provided above but only by the following claims. In other instances, known circuits, structures, apparatuses, and operations are shown not in detail but in block diagrams so as not to obscure the understanding of the description. Where deemed appropriate, the reference numerals or the end portions of the reference numerals are repeated among the drawings to indicate corresponding or similar elements optionally having similar characteristics or the same features, unless specified or obvious otherwise.

Various operations and methods have been described. Some methods have been described by way of flow chart in a relatively basic manner, but these operations can optionally be added to and/or removed from these methods. In addition, although the flowchart shows specific sequences of operations according to various exemplary examples, it is to be understood that the specific sequences are exemplary. Alternative examples may optionally perform these operations in different ways, combine certain operations, interlace some operations, etc. The modules, features, and specific optional details of the devices described herein may also optionally be applied to the methods described herein. In various examples, these methods may be executed by and/or executed within such devices.

In the present disclosure, respective functional parts/units/sub-units/modules/sub-modules/means may be hardware. For instance, the hardware may be a circuit including a digital circuit, an analog circuit, and the like. Physical implementation of hardware structures may include, but is not limited to, physical devices, and the physical devices may include but are not limited to transistors, memristors, and the like. The computation module in the computation device may be any suitable hardware processor such as a CPU, GPU, FPGA, DSP, ASIC, etc. The storage unit may be any suitable magnetic storage medium or magneto-optical storage medium such as RRAM, DRAM, SRAM, EDRAM, HBM, HMC, etc.

Persons skilled in the art can clearly understand that for convenience and conciseness of description, the division of the above-mentioned functional modules is illustrated only as instances, and in practical application, the above-mentioned functions can be assigned to different functional modules to complete according to the needs. In other words, the internal structure of the device can be divided into different functional modules to complete all or a part of the functions described above.

The specific examples described above further explain the purpose, technical solution, and technical effects of the present disclosure in detail. It should be understood that the above description only relates to specific examples of the present disclosure and is not intended to limit the present disclosure, and any modifications, equivalent substitutions, improvements, etc. made within the spirit and principles of the present disclosure should all be included within the scope of protection of the present disclosure.

What is claimed is:

1. A fused vector multiplier for computing an inner product between vectors, comprising:
    multiple multiplication sub-units configured to perform multiplication between a multiplier number vector and a multiplicand vector;
    wherein the multiplier number vector includes one or more first elements and the multiplicand vector includes one or more second elements, and
    wherein each of the multiplication sub-units is configured to:
        respectively retrieve one or more least significant bits of each of the one or more first elements,
        multiply each of the one or more least significant bits with a respective one of the one or more second elements, and
        remove the retrieved one or more least significant bits from each of the one or more first elements;
    an adder tree configured to add results output from the multiplication sub-units; and
    a result register configured to store addition results output from the adder tree and feed the addition results back to the adder tree,
    wherein each of the multiplication sub-units includes a first shift register for retrieving the one or more least significant bits from the first elements of the multiplier number vector,
    wherein each of the multiplication sub-units further includes a second shift register configured to left shift a result of multiplication between each of the one or more least significant bits and one of the one or more second elements,
    wherein the second shift register is configured to determine a count of bits to be left shifted based on an ordinality of the current left shift operation, and
    wherein, the second shift register is configured to determine the count of bits to be left shifted for an $i^{th}$ left shift operation based on a following equation:
    $(i-1)*n+(j-1)$, in which i indicates the ordinality of a current left shift operation, n indicates a count of the least significant bits, and j indicates a position of a current bit in the least significant bits.

2. The fused vector multiplier of claim 1, wherein each of the multiplication sub-units includes an input selection circuit configured to perform a bitwise AND operation between each of the one or more least significant bits and one of the one or more second elements respectively, and send the result to the second shift register.

3. The fused vector multiplier of claim 1, wherein each of the multiplication sub-units is configured to respectively retrieve two least significant bits of each of the one or more first elements.

4. A method for computing an inner product between vectors, comprising:
    performing, by multiple multiplication sub-units, multiplication between a multiplier number vector and a multiplicand vector, wherein the multiplier number vector includes one or more first elements and the multiplicand vector includes one or more second elements;

respectively retrieving, by each of the multiplication sub-units, one or more least significant bits of each of the one or more first elements;

multiplying, by each of the multiplication sub-units, each of the one or more least significant bits with a respective one of the one or more second elements;

removing, by each of the multiplication sub-units, the retrieved one or more least significant bits from each of the one or more first elements;

adding, by an adder tree, results output from the multiplication sub-units;

storing, by a result register, addition results output from the adder tree;

feeding, by the result register, the addition results back to the adder tree;

retrieving, by a first shift register of each of the multiplication sub-units, the one or more least significant bits from the first elements of the multiplier number vector;

left shifting, by a second shift register, a result of multiplication between each of the one or more least significant bits and one of the one or more second elements;

determining, by the second shift register, a count of bits to be left shifted based on an ordinality of a current left shift operation; and determining, by the second shift register, the count of bits to be left shifted for the current left shift operation based on a following equation:

$(i-1)*n+(j-1)$, in which i indicates the ordinality of a current left shift operation, n indicates a count of the least significant bits, and j indicates a position of a current bit in the least significant bits.

5. The method of claim 4, further comprising:

performing, by an input selection circuit of each of the multiplication sub-units, a bitwise AND operation between each of the one or more least significant bits and one of the one or more second elements respectively; and sending, by the input selection circuit, the result to the second shift register.

6. The method of claim 4, wherein a count of the least significant bits is 2.

* * * * *